United States Patent
Rajashekar Vashisht et al.

(10) Patent No.: US 10,965,484 B2
(45) Date of Patent: Mar. 30, 2021

(54) FLEET OF HOME ELECTRONIC SYSTEMS

(71) Applicant: Opendoor Labs Inc., San Francisco, CA (US)

(72) Inventors: Harsha Rajashekar Vashisht, Santa Clara, CA (US); Sudarshan Narasimha Raghavan, Dublin, CA (US); Wenyang Dong, Dublin, CA (US); Connor Alan Jacobsen, San Francisco, CA (US); Diyu Lei, San Francisco, CA (US); Bradford Ludwig Bonney, San Francisco, CA (US); Sheng Wu, San Francisco, CA (US); Salman Jamali, Lawrenceville, GA (US); Eric Mayers, San Francisco, CA (US)

(73) Assignee: Opendoor Labs Inc., San Francisco, CA (US)

( * ) Notice: Subject to any disclaimer, the term of this patent is extended or adjusted under 35 U.S.C. 154(b) by 0 days.

(21) Appl. No.: 16/230,331

(22) Filed: Dec. 21, 2018

(65) Prior Publication Data

US 2020/0204393 A1 Jun. 25, 2020

(51) Int. Cl.
*H04L 12/28* (2006.01)
*H04L 29/08* (2006.01)

(52) U.S. Cl.
CPC ...... *H04L 12/2818* (2013.01); *H04L 12/2825* (2013.01); *H04L 67/125* (2013.01); *H04L 2012/2841* (2013.01)

(58) Field of Classification Search
CPC ..... H04L 12/12; H04L 12/282; H04L 12/283; H04L 12/2807; H04L 12/2816; H04L 12/2825; H04L 12/2829; H04L 12/2832; H04L 12/2834; H04L 12/2852; H04L 12/4625; H04L 67/42; H04L 67/125; H04L 67/1002; H04L 67/12; H04L 67/2833

(Continued)

(56) References Cited

U.S. PATENT DOCUMENTS 10,133,443 B2 * 11/2018 Von Dehsen ........ G05B 19/042
10,546,469 B2 * 1/2020 Peterson .................. G08B 5/22
(Continued)

*Primary Examiner* — John A Follansbee
*Assistant Examiner* — James N Fiorillo
(74) *Attorney, Agent, or Firm* — Schwegman Lundberg & Woessner, P.A.

(57) ABSTRACT

Systems and methods to manage a fleet of home electronic systems are described. The system receives, over a network, event information at a home fleet management system. The event information is received from home electronic systems and includes sensor information. The system aggregates the sensor information according to geographic areas to generate first aggregated sensor information. The system generates first user interface information based on the first aggregated sensor information. The system receives first selection information including a metric identifier and a geographic identifier. The system generates second user interface information based on the first selection information. The system receives second selection information identifying a group of home electronic systems and an action. The system communicates action information to selected home electronic systems based on the action to cause the action to be performed at the selected home electronic systems.

20 Claims, 17 Drawing Sheets

(58) Field of Classification Search
USPC .................................................. 709/202, 224
See application file for complete search history.

(56) References Cited

U.S. PATENT DOCUMENTS

| | | | | |
|---|---|---|---|---|
| 2009/0323904 A1* | 12/2009 | Shapiro | H04M 11/04 | 379/39 |
| 2010/0094981 A1* | 4/2010 | Cordray | H04L 41/082 | 709/222 |
| 2011/0211584 A1* | 9/2011 | Mahmoud | H04L 12/2838 | 370/401 |
| 2012/0278877 A1* | 11/2012 | Baum | H04L 63/20 | 726/12 |
| 2012/0313755 A1* | 12/2012 | Gutierrez | G08B 13/19671 | 340/8.1 |
| 2012/0317507 A1* | 12/2012 | Gutierrez | H04N 7/181 | 715/771 |
| 2013/0246501 A1* | 9/2013 | Scheer | G08B 25/006 | 709/202 |
| 2014/0052303 A1* | 2/2014 | Venkatakrishnan | G06F 1/3203 | 700/291 |
| 2014/0313032 A1* | 10/2014 | Sager | G08B 25/003 | 340/539.17 |
| 2015/0156031 A1* | 6/2015 | Fadell | G08B 19/005 | 700/276 |
| 2015/0369618 A1* | 12/2015 | Barnard | G01S 19/13 | 701/491 |
| 2016/0055422 A1* | 2/2016 | Li | G05B 15/02 | 706/12 |
| 2016/0065413 A1* | 3/2016 | Sundermeyer | G08B 25/14 | 370/254 |
| 2016/0132031 A1* | 5/2016 | Kozura | H04L 12/2816 | 700/275 |
| 2016/0148507 A1* | 5/2016 | Pittman | G06Q 30/0255 | 340/917 |
| 2016/0189505 A1* | 6/2016 | Boettcher | G08B 19/00 | 340/541 |
| 2017/0069353 A1* | 3/2017 | Taxier | G08B 13/19684 | |
| 2017/0074537 A1* | 3/2017 | Bentz | G06Q 20/145 | |
| 2017/0261954 A1* | 9/2017 | Li | G05B 19/042 | |
| 2017/0301220 A1* | 10/2017 | Jarrell | H04W 4/38 | |
| 2017/0310827 A1* | 10/2017 | Mehta | H04M 3/42357 | |
| 2018/0018508 A1* | 1/2018 | Tusch | G06K 9/00771 | |
| 2018/0102914 A1* | 4/2018 | Kawachi | G10L 15/22 | |
| 2018/0143047 A1* | 5/2018 | Gal | G05D 7/0635 | |
| 2018/0145844 A1* | 5/2018 | Pera | H04L 12/2816 | |
| 2018/0181091 A1* | 6/2018 | Funk | G08G 1/07 | |
| 2019/0025782 A1* | 1/2019 | Mathews | G05B 15/02 | |
| 2019/0079651 A1* | 3/2019 | Li | G01W 1/06 | |
| 2019/0158304 A1* | 5/2019 | Sundermeyer | H04L 67/125 | |
| 2019/0173755 A1* | 6/2019 | Jadhav | H04L 63/10 | |
| 2019/0174208 A1* | 6/2019 | Speicher | H04Q 9/00 | |
| 2019/0245869 A1* | 8/2019 | Dawes | H04L 12/2803 | |
| 2019/0346417 A1* | 11/2019 | Benefield | G01N 33/0034 | |
| 2020/0117900 A1* | 4/2020 | Deng | H04W 4/02 | |

\* cited by examiner

600

USER INTERFACE INFORMATION

| HOME IDENTIFIER | | SUBMIT |

606, 609, 602, 608

SYSTEM HEALTHY / SYSTEM ISSUES

| METRIC IDENTIFIER | GEOGRAPHIC IDENTIFIER | ACTION IDENTIFIER |
| 610 | 612 | 614 |

| SYSTEM HEALTHY | | SYSTEM ISSUES | |
|---|---|---|---|
| MARKET | TOTAL HEALTHY | MARKET | TOTAL ISSUES |
| ALL | 98% | ALL | 2% |
| PHOENIX | 98% | PHOENIX | 2% |
| LAS VEGAS | 98% | LAS VEGAS | 2% |
| ORLANDO | 98% | ORLANDO | 2% |

USER INTERFACE INFORMATION

| HOME IDENTIFIER | | 609 |
|---|---|---|
| | 606 | SUBMIT |
| | 608 | |

SYSTEM HEALTHY / SYSTEM ISSUES

| METRIC IDENTIFIER | GEOGRAPHIC IDENTIFIER | ACTION IDENTIFIER |
|---|---|---|
| 610 | 612 | 614 |

| TEMPERATURE IN RANGE | | TEMPERATURE OUT OF RANGE | |
|---|---|---|---|
| MARKET | TEMP IN RANGE | MARKET | TEMP OUT OF RANGE |
| ALL | 98% | ALL | 2% |
| PHOENIX | 98% | PHOENIX | 2% |
| LAS VEGAS | 98% | LAS VEGAS | 2% |
| ORLANDO | 98% | ORLANDO | 2% |

*FIG. 6B*

USER INTERFACE INFORMATION

| HOME IDENTIFIER | | 609 | 602 |

606
608 SUBMIT

SYSTEM HEALTHY / SYSTEM ISSUES

| METRIC IDENTIFIER | GEOGRAPHIC IDENTIFIER | ACTION IDENTIFIER |
610  612  614

644  646  648

| ADDRESS | ZIPCODE | STATUS |
|---|---|---|
| 1234 XYZ LANE PHOENIZ, AZ | 95020 | TEMPERATURE OUT OF RANGE |
| 5234 ABC RD. PHOENIZ, AZ | 95121 | TEMPERATURE OUT OF RANGE |
| 1111 AAA AVE PHOENIZ, AZ | 95000 | TEMPERATURE OUT OF RANGE |
| 2222 XYZ LANE PHOENIZ, AZ | 95020 | TEMPERATURE OUT OF RANGE |
| 4321 XYZ LANE PHOENIZ, AZ | 95020 | TEMPERATURE OUT OF RANGE |

*FIG. 6C*

FLEET OF HOME ELECTRONIC SYSTEMS

TECHNICAL FIELD

This disclosure relates to the technical field of data communications and more particularly to systems and methods to manage a fleet of home electronic systems.

BACKGROUND

Managing a fleet of home electronic systems presents multiple challenges. For example, collecting and presenting status on multiple and diverse objects creates challenges. Further, controlling the objects using control mechanisms and access points creates additional challenges.

BRIEF DESCRIPTION OF THE DRAWINGS

FIGS. 6A-6C are block diagrams illustrating user interface information, according to an embodiment;

DETAILED DESCRIPTION

Systems and methods for managing a fleet of home electronic systems are described. Home electronic systems may be in homes that are dispersed over a wide geographic range. The home electronic systems may include hubs for centrally communicating, sensors for receiving sensor data, and controllers for controlling devices. One aspect of the present application is a meaningful display of metrics reporting on the status of the fleet of home electronic systems and an efficient means of controlling devices within the fleet of home electronic systems. To this end, event information may be received over a network at a home fleet management application. The event information may be received from sensors located in the home electronic systems that sense various physical phenomena in the homes. For example, the sensors may report the ambient temperature in the home, whether a door is locked or unlocked, motion in the home, whether a window is open or closed, whether water is running, and so forth. Further, the received sensor information may be delivered to a central store over a network, aggregated and displayed according to geographic areas circumscribing sets of homes. Focus may be configured by selecting an identifier that identifies larger geographic areas (e.g., states), smaller geographic areas (e.g., counties) or directed to a single home. In addition, metrics for the home electronic systems may be presented by utilizing a paired presentation architecture responsive to selection of a metric identifier. The paired metric presentation architecture (e.g., "System—online/offline") simultaneously presents the same metric on a single user interface from two points of view. Accordingly, the paired metric architecture facilitates an immediate viewing of both positive and negative compliments of the same underlying information. Further, an action identifier may be received and executed for the home electronic systems presently displayed to control devices (e.g., hubs, controllers, sensors) in the home. For example, an action identifier may be received and executed to set a temperature range in thermostats controlled by home electronic systems located in a geographic area presently being displayed.

Figure 1A:
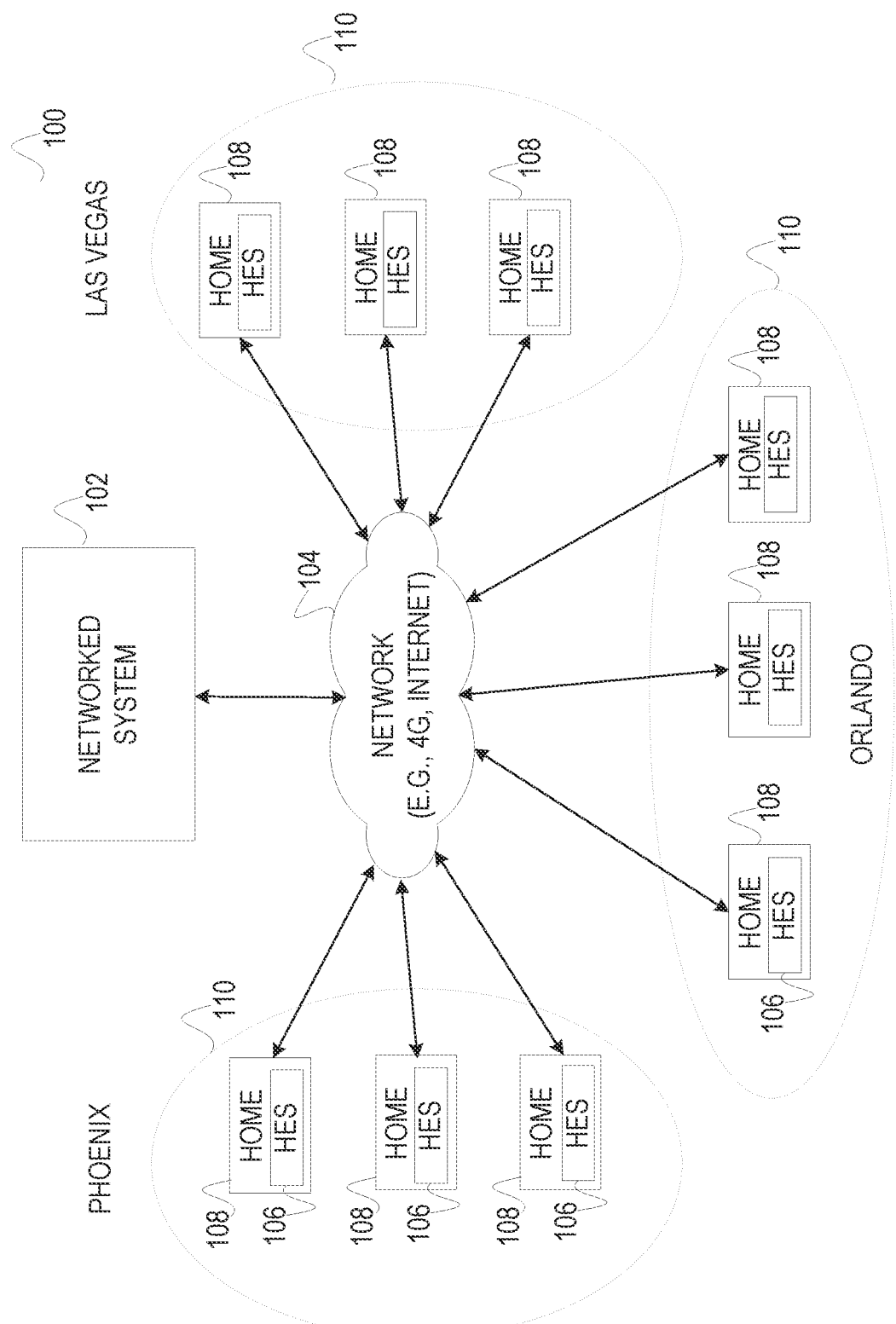
FIG. 1A is a block diagram illustrating a system, according to an embodiment, to manage a fleet of home electronic systems.

FIG. 1A is a block diagram illustrating a system 100, according to an embodiment, to manage a fleet of home electronic systems. The system 100 may include a networked system 102, communicating over a network 104, with home electronic systems 106 respectively included in homes 108 located in geographic areas 110 such as countries, cities, states, regions, and the like. For example, the geographic areas 110 illustrated include Phoenix, Las Vegas and Orlando. The networked system 102 may be accessed in a cloud computing platform or as a standalone proprietary platform. The cloud computing platform may provide virtual clusters of computers emulating attributes of a real computer including hardware; operating systems; networking software; and application software. In addition, the cloud computing platform may virtualize a console enabling subscribers to connect to a system hosted by the cloud computing platform using a browser that acts as a window into the virtual computer. The cloud computing platform may enable subscribers to log in and configure and use their virtual systems as real physical computers. The networked system 102 may be embodied as Amazon Web Services (AWS®), a service provided by Amazon Web Services, Inc; Azure®, a service provided by Microsoft Corporation; or Google Cloud Platform®, a service provided by Google, Inc.

The network 104 may be embodied as interconnected networks utilizing different technologies including the Internet, broadband, cellular data network technology (e.g., 4G), short message service (e.g. SMS) wide area networking (WAN), wireless networking (Institute of Electrical and Electronics Engineers (IEEE) 802.11, local area networking (LAN), and so forth.

Figure 1B:
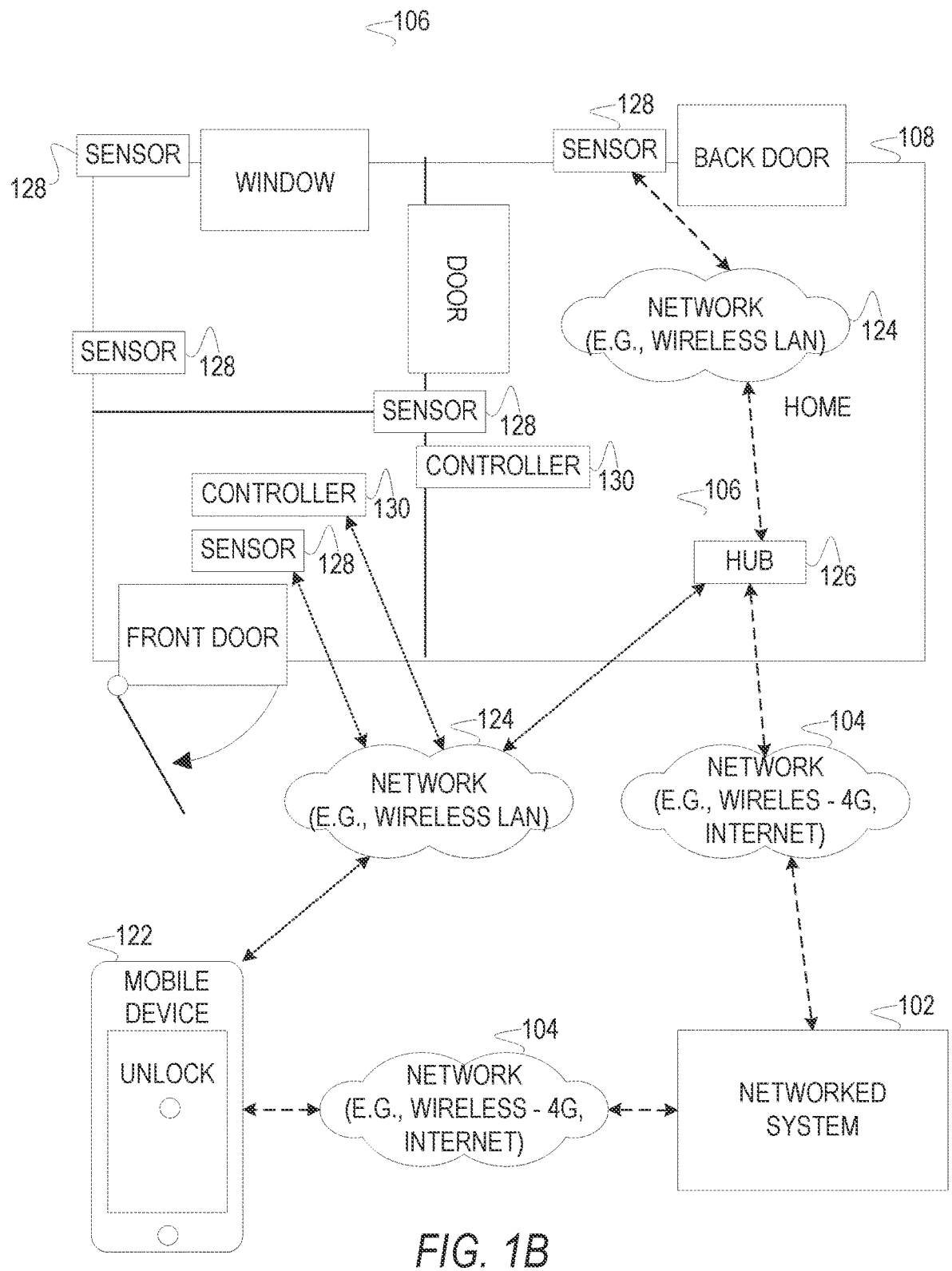
FIG. 1B is a block diagram illustrating a home electronic system, according to an embodiment.

FIG. 1B is a block diagram illustrating a home electronic system 106, according to an embodiment. The home electronic system 106 is associated with a home 108 and includes a hub 126. The hub 126 is communicatively coupled, over the network 124 (e.g., wireless LAN), with one or more sensors 128, one or more controllers 130, and the mobile device 122. In addition, the hub 126 may be communicatively coupled, over the network 104 (e.g., 4G, Internet), with the networked system 102. The mobile device 122 may be communicatively coupled to the hub 126, the one or more sensors 128, and the one or more controllers 130, over the network 124 (e.g., wireless LAN). Finally, the mobile device 122 may be communicatively coupled to the networked system 102 via the network 104.

Mobile Device

The mobile device 122 may be utilized for pairing home electronic components (HEC) and for operating the home electronic system 106. The mobile device 122 may pair HECs (e.g., sensors 128, controllers 130, hubs 126) by communicating over the network 124 (e.g., wireless LAN), located in or around the home 108, to pair the sensors 128 or controllers 130 to the hub 126. An example of the mobile device 122 pairing a sensor 128 with the hub 126 and a controller 130, with the hub 126 is illustrated over dotted lines. Further, the mobile device 122 may be used to confirm whether pairing with HECs is properly completed. For example, the mobile device 122 may communicate a message to a HEC causing the HEC to run a pairing self-test before communicating a message including a status (e.g., success/failure) back to the mobile device 122. After pairing, the sensors 128 and the controllers 130 may communicate directly with the hub 126 that, in turn, communicates over the network 104 with the networked system 102. For example, the sensor 128 that is located to the left of the "BACK DOOR" communicates via the network 124 with the hub 126 that, in turn, communicates over the network 104 with the networked system 102, as illustrated with dashed lines. The mobile device 122 may be used to confirm the proper operation of the HEC. For example, the mobile device 122 may communicate a message to the HEC causing the HEC to run an operation self-test before communicating a message including a status (e.g., pass/fail) back to the mobile device 122.

In addition, the mobile device 122 may be used to operate the home electronic system 106. The mobile device 122 may operate the home electronic system 106 by communicating over the network 104 (e.g., 4G, Internet, WAN, and so forth) with the networked system 102 that, in turn, communicates with the hub 126 to cause actions in the home. For example, an operator of the mobile device 122 may select a button on a user interface being displayed on the screen of the mobile device 122 that, responsive to receiving a selection (e.g., "Unlock Door"), communicates command information, over the network 104, to the networked system 102 that, in turn, communicates action information, over the network 104, to the hub 126 causing the controller 130 located above the "FRONT DOOR" to unlock the door.

Sensors

The sensors 128 may be located throughout the home 108 and communicate sensor information, over the network 124, to the hub 126 that, in turn, communicates the sensor information, over the network 104, to the networked system 102. Each sensor 128 may sense physical phenomenon in or around the home 108 and communicate a discrete status or a measurement of the physical phenomenon, as sensor information, via the hub 126, to the networked system 102. For example, the sensor 128 located over the "FRONT DOOR" may sense a position of a door relative to the sensor 128 and communicate sensor information indicating the status of the door (e.g., open/closed) to the networked system 102. In addition, the sensors 128 may sense a window and communicate sensor information indicating a status of the window (e.g., open/closed). In addition, the sensors 128 may sense an ambient temperature and communicate a measurement of the ambient temperature (e.g., Celsius/Fahrenheit) or a status of the ambient temperature (e.g., out of temperature range/in temperature range). In addition, the sensors 128 may sense a motion of an object and communicate a measurement of the motion (e.g., vector—speed and direction) or a status of the motion (e.g., motion detected/motion not detected). In addition, the sensors 128 may sense an attempted pairing and communicate a status (e.g., paired/not paired).

Controllers

The networked system 102 may communicate action information, over the network 104, to the hub 126. The networked system 102 may communicate action information to the hub 126 to cause a controller 130 to control a mechanism that is associated with the controller. For example, a controller 130 may control a siren to sound or stop sounding, a lock to lock or unlock, a playback device to play or stop playing, a video recorder to record or stop recording, a webcam to broadcast or stop broadcasting a stream, a multimedia player to play or stop playing a multimedia presentation, a recording device to record or stop recording sound, and the like.

Hub

The networked system 102 may communicate action information, over the network 104, to the hub 126 or receive event information, over the network 104, from the hub 126. In addition, the networked system 102 may communicate the action information to control the hub 126. For example, the hub 126 may be reset, restarted, or caused to switch from a primary to a backup battery. Further, the networked system 102 may communicate action information, over the network 104, via the hub 126, to a controller 130 or a sensor 128. For example, the networked system 102 may communicate action information, via the hub 126, to restart a controller 130 or a sensor 128. Further, the networked system 102 may receive event information, over the network 104, via the hub 126 from a controller 130 or a sensor 128, as previously described.

Figure 2A:
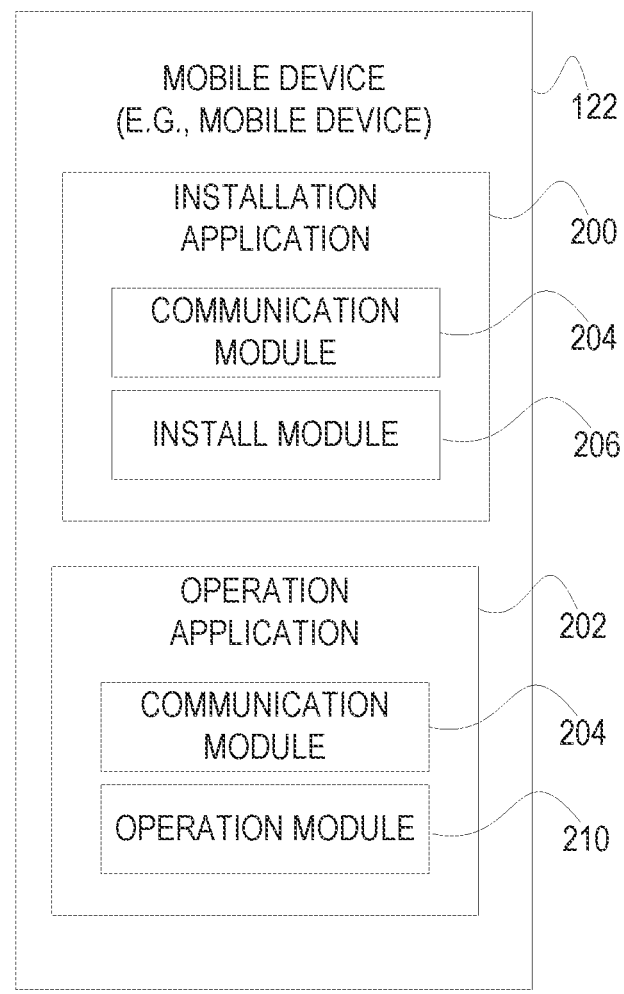
FIG. 2A is a block diagram illustrating a device, according to example embodiments.

FIG. 2A is a block diagram illustrating the mobile device 122, according to an example embodiment. The mobile device 122 may be embodied as a mobile phone, a laptop computer, smartphone, personal digital assistant, watch, or some other device enabled for network communications. The mobile device 122 may include an installation application 200 and an operation application 202. The installation application 200 may be used to install a home electronic system 106 in a home 108. For example, the installation application 200 may be utilized for pairing a sensor 128 to the hub 126 or for pairing a controller 130 to the hub 126, as previously described. Further, the installation application 200 may be utilized for validating user credentials in association with a home 108. For example, the installation application 200 may require a user to enter their credentials in the form of a username and password on the keyboard of the mobile device 122. The installation application may include a communication module 204 and an install module 206. The communication module 204 may be utilized to communicate with sensors 128, controllers 130, hubs 126, the network 124, the network 104, and the networked system 102. The install module 206 may be utilized to process the communications.

The operation application 202 may be utilized by a user of the mobile device 122 to operate a home electronic system 106. For example, the operation application 202 may be utilized for unlocking doors, setting temperature ranges, selecting music for playback, stopping playback, operating a siren, operating cameras, resetting a hub, sensor, or controller, and so forth. Further, the operation application 202 may require a user to enter their credentials or biometric information before the networked system 102 unlocks a door to the home 108. The operation application 202 may include the communication module 204, as previously described, and an operation module 210. The operation module 210 may be utilized to process the communications.

Figure 2B:
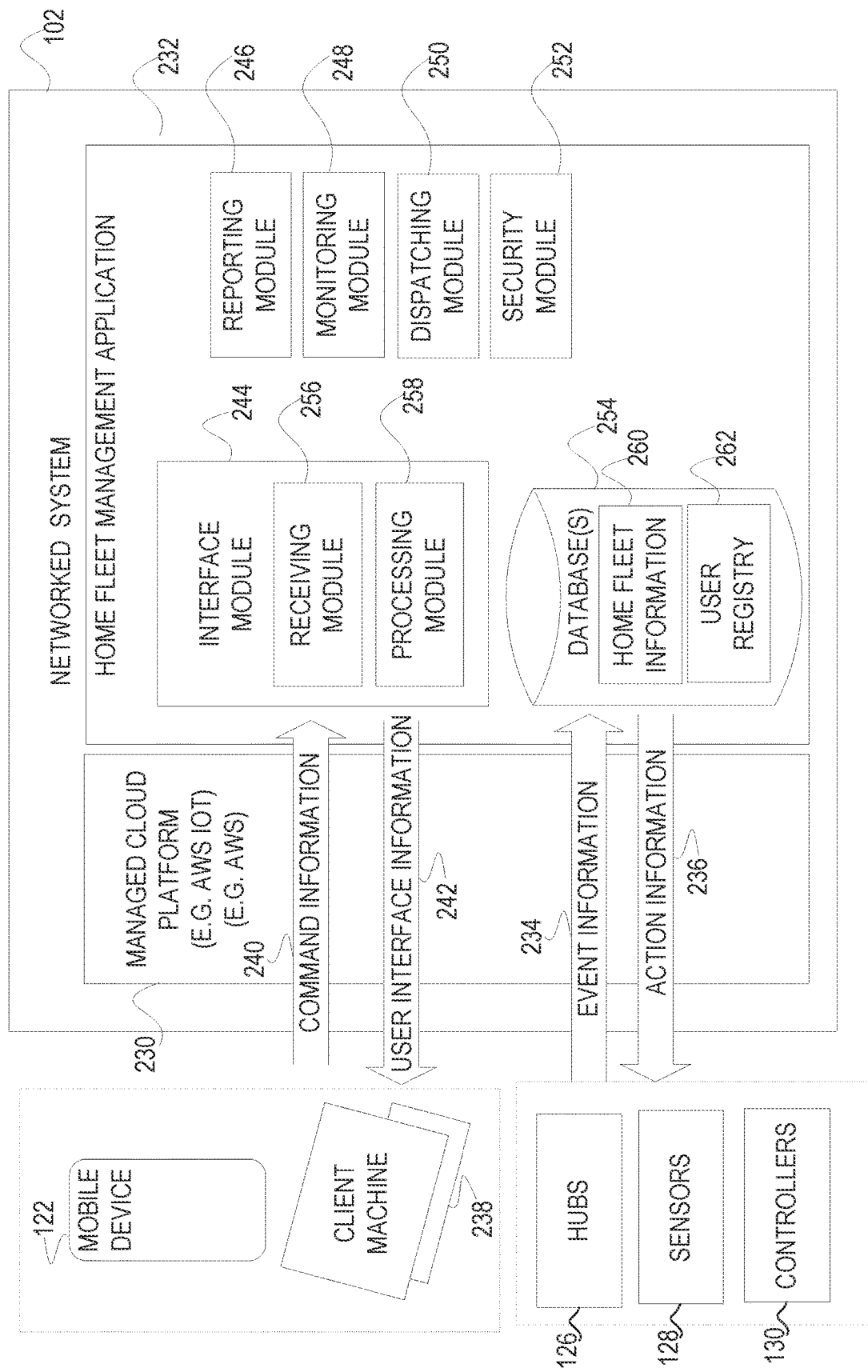
FIG. 2B is a block diagram illustrating a networked system, according to example embodiments, to manage a fleet of home electronic systems.

FIG. 2B is a block diagram illustrating the networked system 102, according to example embodiments. The networked system 102 communicates with mobile devices 122 (e.g., mobile phones) and client machines 238 and with hubs 126, sensors 128, and controllers 130. The networked system 102 may include a managed cloud platform 230 and a home fleet management application 232. The sensors 128 and the controllers 130 may communicate event information 234 to the hubs 126 that, in turn, communicate the event information 234, via the managed cloud platform 230, to the home fleet management application 232. In addition, the hubs 126 communicate their own event information 234, via the managed cloud platform 230, to the home fleet management application 232. The hubs 126 may receive action information 236, via the managed cloud platform 230, from the home fleet management application 232 and communicate the action information 236 to the sensors 128 and the controllers 130. In addition, the hubs 126 may receive action information 236 from the home fleet management application 232 for operating the hub 126.

The client machine 238 and mobile device 122 (e.g., mobile phone) may communicate command information 240, via the managed cloud platform 230, to the home fleet management application 232, and receive user interface information 242 from the home fleet management application 232.

The home fleet management application 232 may include an interface module 244, a reporting module 246, a monitoring module 248, a security module 252, a dispatching module 250, and a database 254. The interface module 244 may be utilized to interact with the managed cloud platform 230 and, according to an embodiment, includes a receiving module 256 and a processing module 258.

The receiving module 256 may receive the command information 240 and the event information 234. The processing module 258 may process the command information 240 and the event information 234 and, responsive to the processing, generate and communicate the user interface information and the action information 236. The command information 240 may cause the display of metrics and/or the performance of operations in one or more home electronic systems 106. For example, the command information 240 may include an "Unlock Door" command, a "Lock Door" command, a "Set Temperature Range" command, an "Illuminate Light" command, an "Extinguish Light" command, an "Adjust Light" (e.g., dim or brighten) command, a "Play Music" command, a "Stop Music" command, an "Execute Script" command, and so forth. The command information 240 may further cause the display of various metrics for home electronic systems 106 located in different geographic areas or for a single home electronic system 106. The metrics may be presented in the form of paired metrics. For example, the paired metrics may include a "System—healthy/issues" paired metric, "System—online/offline" paired metric, "Paired—all/issues" paired metric, an "Access—normal/issues" paired metric, a "Temperature—in range/out of range" paired metric, an "All sensor—normal/trouble" paired metric, and so forth.

Further, the processing module 258 may interact with the reporting module 246, the monitoring module 248, the dispatching module 250, and the security module 252. The reporting module 246 may be utilized by the receiving module 256 to consume the event information 234. In addition, the reporting module 246 may store the event information 234 in the database 254. The monitoring module 248 may be utilized to monitor exigent conditions in the homes 108. For example, an exigent condition may include the sound of a window breaking, an unexpected motion, an ambient temperature being out of an expected range, and so forth. The dispatching module 250 may be utilized to dispatch a third-party service responsive to the identification of an exigent condition. For example, the dispatching module 250 may identify a window repair service and communicate an email to the window repair service requesting the dispatch of a repair person to a home 108 responsive to the monitoring module 248 identifying an exigent condition in the form of a window that is broken in the home 108 (e.g., as reported by a sensor 128). The security module 252 may be utilized to communicate a warning responsive to the sensing of an exigent condition. For example, the security module 252 may identify a siren that is coupled to a controller 130 in a home 108 and communicate action information 236 to the controller 130 to cause the siren to sound responsive to the monitoring module 248 identifying an exigent condition in the form of a broken window. Finally, the database 254 provides for persistent storage of home fleet information 260 and a user registry 262. For example, the home fleet information 260 stores the event information 234 generated by the hubs 126, sensors 128, controllers 130. In addition, the home fleet information 260 stores other information related to each home 108, as described further below. The user registry 262 stores information related to the users who operate the home fleet management system, as described further below.

Figure 3A:
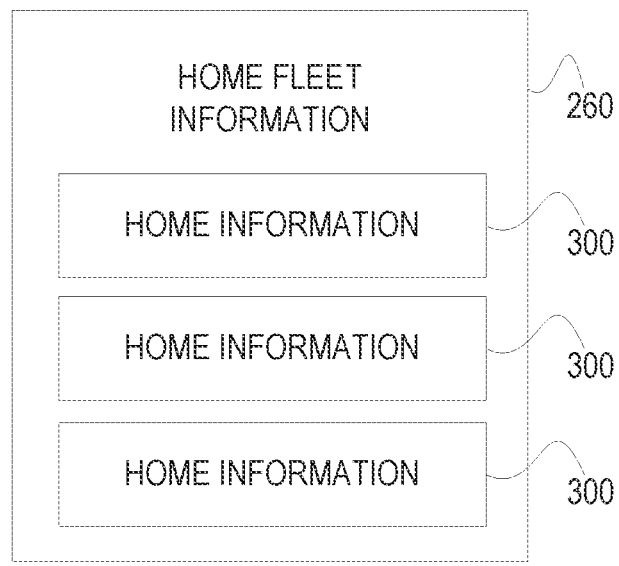
FIG. 3A is a block diagram illustrating home fleet information, according to example embodiments.

FIG. 3A is a block diagram illustrating home fleet information 260, according to an embodiment. The home fleet information 260 may include a home information 300 record for each home 108 in the system 100.

Figure 3B:
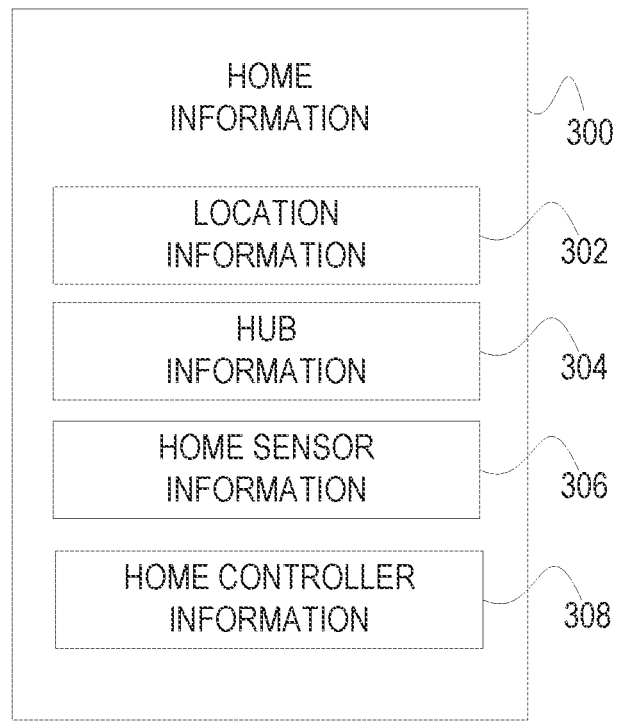
FIG. 3B is a block diagram illustrating home information, according to example embodiments.

FIG. 3B is a block diagram illustrating home information 300, according to example embodiments. The home information 300 may include location information 302, hub information 304, home sensor information 306, and home controller information 308. The location information 302 may identify the location of the home. For example, the location information 302 may store country information identifying a country, state information identifying a state, county information identifying a county, and city information identifying a city, and so forth. Further, the location information 302 may include coordinate information including the coordinates on a map marking the location of the home. For example, the coordinate information may include latitude information and longitude information. The hub information 304 may store information associated with the hub 126 and event information 234 received from the hub 126. The home sensor information 306 may store information associated with sensors 128 in the home 108 and event information 234 received from the sensors 128 in the home 108. The home controller information 308 may store information associated with controllers 130 in the home 108 and event information 234 received from the controllers 130 in the home 108.

Figure 3C:
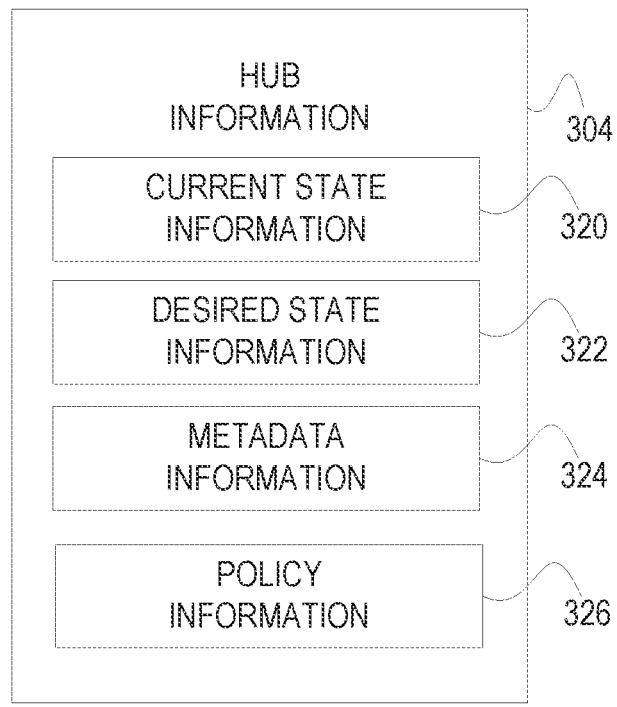
FIG. 3C is a block diagram illustrating hub information, according to example embodiments.

FIG. 3C is a block diagram illustrating hub information 304, according to an example embodiment. The hub information 304 may include current state information 320, desired state information 322, metadata information 324, and policy information 326. The current state information 320 registers the current state of the hub 126. Further, the hub 126 may transition between states responsive to receiving command information 240, receiving event information 234, or processing by the home fleet management application 232. For example, the hub 126 may be registered as "Active," "Standby," "Down," or another state, and may transition from "Active" to "Standby" to run self-diagnostics responsive to a reset.

The desired state information 322 registers a desired state of the hub 126. A difference between the registered state and the desired state may trigger processing by the home fleet management application 232. For example, the desired state may be "Active" but the hub 126 may not be communicating with the home fleet management application 232, resulting in the current state being "Missing," causing the processing module 258 to invoke the dispatching module 250 to dispatch service personnel to repair the hub 126.

The metadata information 324 may store metadata associated with the hub 126. For example, the metadata information 324 may store the make, model, software version, and year the hub 126 was manufactured. Further, the metadata information 324 may store a service personnel identifier identifying the identity of the service personnel who installed the hub 126. Further, the metadata information 324 may store event information 234 received from the hub 126.

The policy information 326 may store one or more policies for the hub 126. For example, a policy may be configured with a client machine 238 and include rules causing the hub 126 to transition to the "Down" state responsive to identifying no sensors 128 or controllers 130 as being paired to the hub 126.

Figure 3D:
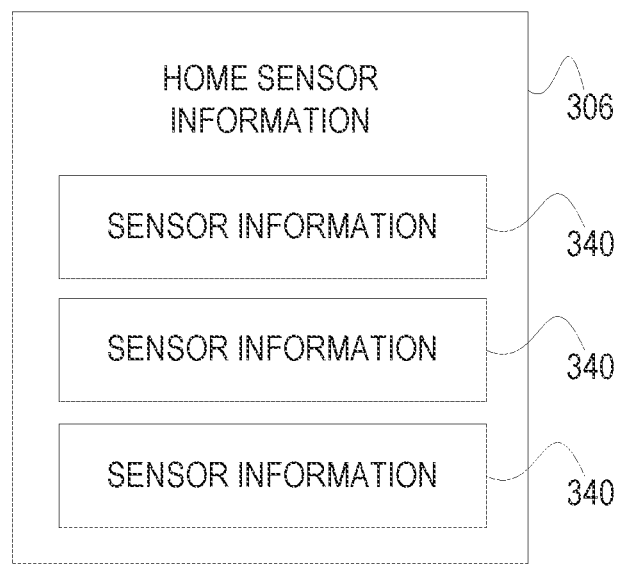
FIG. 3D is a block diagram illustrating home sensor information, according to example embodiments.

FIG. 3D is a block diagram illustrating home sensor information 306, according to an example embodiment. The home sensor information 306 may store an entry of sensor information 340 for each sensor 128 that is paired to the hub 126 associated with the home electronic system 106.

Figure 3E:
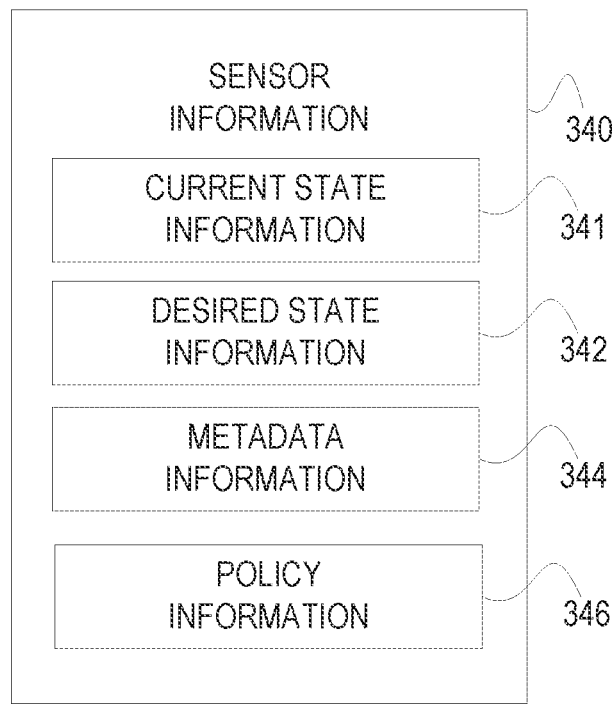
FIG. 3E is a block diagram illustrating sensor information, according to example embodiments.

FIG. 3E is a block diagram illustrating sensor information 340, according to example embodiments. The sensor information 340 may include current state information 341, desired state information 342, metadata information 344, and policy information 346. The current state information 341 registers the current state of the sensor 128. Further, the sensor 128 may transition between states responsive to receiving command information 240, receiving event information 234, or processing by the home fleet management application 232. For example, the sensor 128 may be registered in "Active," "Down," or "Missing" states and transition between states.

The desired state information 342 may register the desired state of the sensor 128. A difference between the registered state and the desired state may trigger processing by the home fleet management application 232. For example, the desired state information 342 may be "Active" but the sensor 128 may not be communicating with the hub 126, resulting in the current state information 341 indicating a "Missing" state, causing the processing module 258 to invoke the dispatching module 250 to dispatch service personnel to repair the sensor 128.

The metadata information 344 may store metadata describing the hub sensor 128. For example, the metadata information 344 may store the make, model, software version, and year of manufacture of the sensor 128. Further, the metadata information 344 may store a service personnel identifier identifying the service personnel who installed the sensor 128. Further, the metadata information 344 may store event information 234 received from the sensor 128.

The policy information 346 may store one or more policies for the sensor 128. For example, a policy may include rules to transition the sensor 128 to the "Missing" state responsive to identifying the sensor 128 as paired to the hub 126 and identifying that sensor information has not been received at the networked system 102 for a predetermined period (e.g., 1 minute).

Figure 3F:
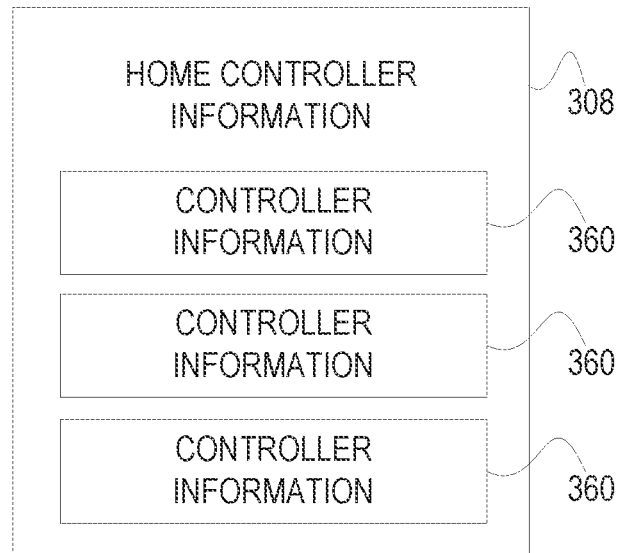
FIG. 3F is a block diagram illustrating home controller information, according to example embodiments.

FIG. 3F is a block diagram illustrating home controller information 308, according to an example embodiment. The home controller information 308 may store an entry of controller information 360 for each controller 130 that is paired to the hub 126 associated with the home electronic system 106.

Figure 3G:
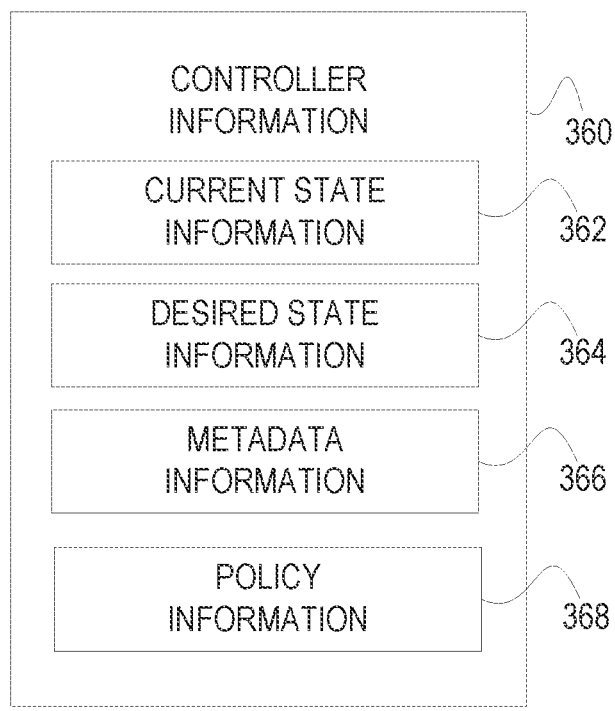
FIG. 3G is a block diagram illustrating controller information, according to example embodiments.

FIG. 3G is a block diagram illustrating controller information 360, according to an example embodiment. The controller information 360 may include current state information 362, desired state information 364, metadata information 366, and policy information 368. The current state information 362 registers the current state of the controller 130. The controller 130 may transition between states. The controller 130 may transition between states responsive to receiving command information 240, receiving event information 234, or processing by the home fleet management application 232. For example, the "Active" state may be registered for a controller 130 communicating event information 234 in the form of a heart beat at least once every predetermined period (e.g., 1 minute) and the "Missing" state may be registered for a controller 130 paired to the hub 126 and from which the heart beat is not being received before the predetermined period (e.g., 1 minute) (e.g., timeout expired). Accordingly, the controller 130 may transition between states based on command information 240 received from the client machine 238, action information 236 communicated to the controller 130, and event information 234 received or not received from the controller 130.

The desired state information 364 may register the desired state of the controller 130. A difference between the registered state and the desired state may trigger processing by the processing module 258. For example, the desired state may indicate "Active;" however, the controller 130 may not be communicating with the hub 126, resulting in the current state indicating "Missing." Responsive to detecting the difference, the processing module 258 may invoke the dispatching module 250 to dispatch service personnel to repair the controller 130.

The metadata information 366 may store metadata describing the controller 130. For example, the metadata information 366 may store the make, model, software version, and year of manufacture of the controller 130. Further, the metadata information 366 may store a service personnel identifier identifying the service personnel who installed the controller 130. Further, the metadata information 366 may store event information 234 received from the controller 130.

The policy information 368 may store one or more policies for the controller 130. For example, a policy may include rules to transition the controller 130 to the "Missing" state responsive to identifying the sensor 128 as paired to the hub 126 and identifying event information 234 in the form of a heart beat has not been received at the networked system 102 for a predetermined period (e.g., 1 minute).

Figure 3H:
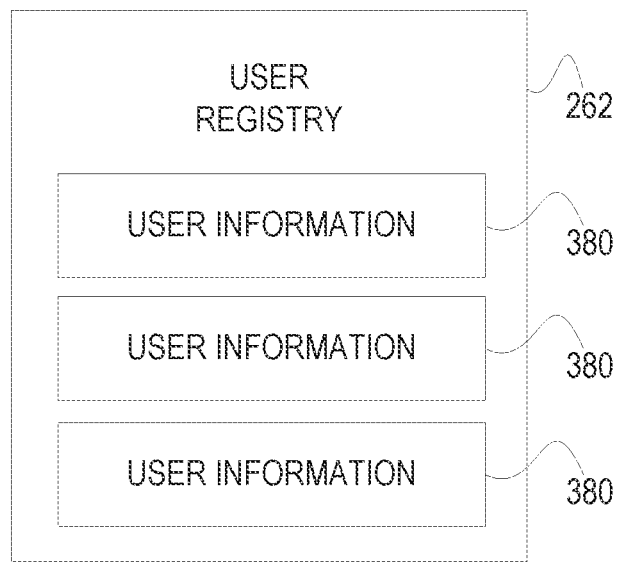
FIG. 3H is a block diagram illustrating a user registry, according to example embodiments.

FIG. 3H is a block diagram illustrating a user registry 262, according to an example embodiment. The user registry 262 may store a record of user information 380 for each user that registers with the system 100.

Figure 3I:
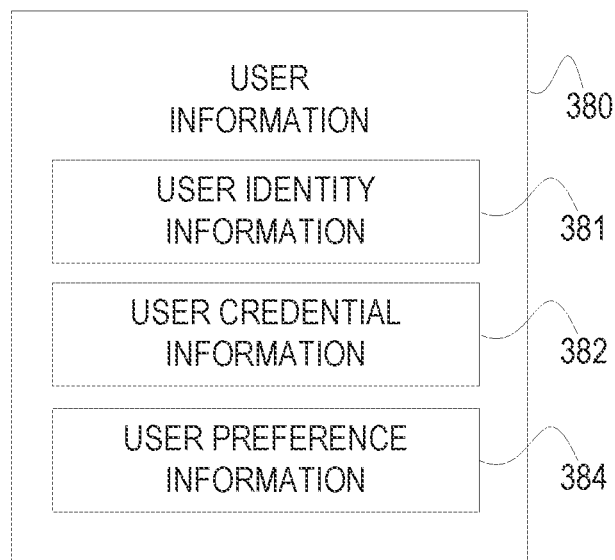
FIG. 3I is a block diagram illustrating user information, according to example embodiments.

FIG. 3I is a block diagram illustrating user information 380, according to an example embodiment. The user information 380 may be received from the mobile device 122 and/or the client machine 238 as command information 240 before being stored. The user information 380 may include user identity information 381, user credential information 382, and user preference information 384. The user identity information 381 may store the name, address, phone number, and other identity information associated with a user. The user credential information 382 may store user name, password, biometric data, and other information that may be used to authenticate the identity of the user. The user preference information 384 may store the preferences of the user. For example, the preference information 384 may store preferred parameters for commands received from the mobile device 122, as described later. Further for example, the preference information 384 may store scripts that are executed responsive to the user entering a home 108

Figures 4A, 4B:
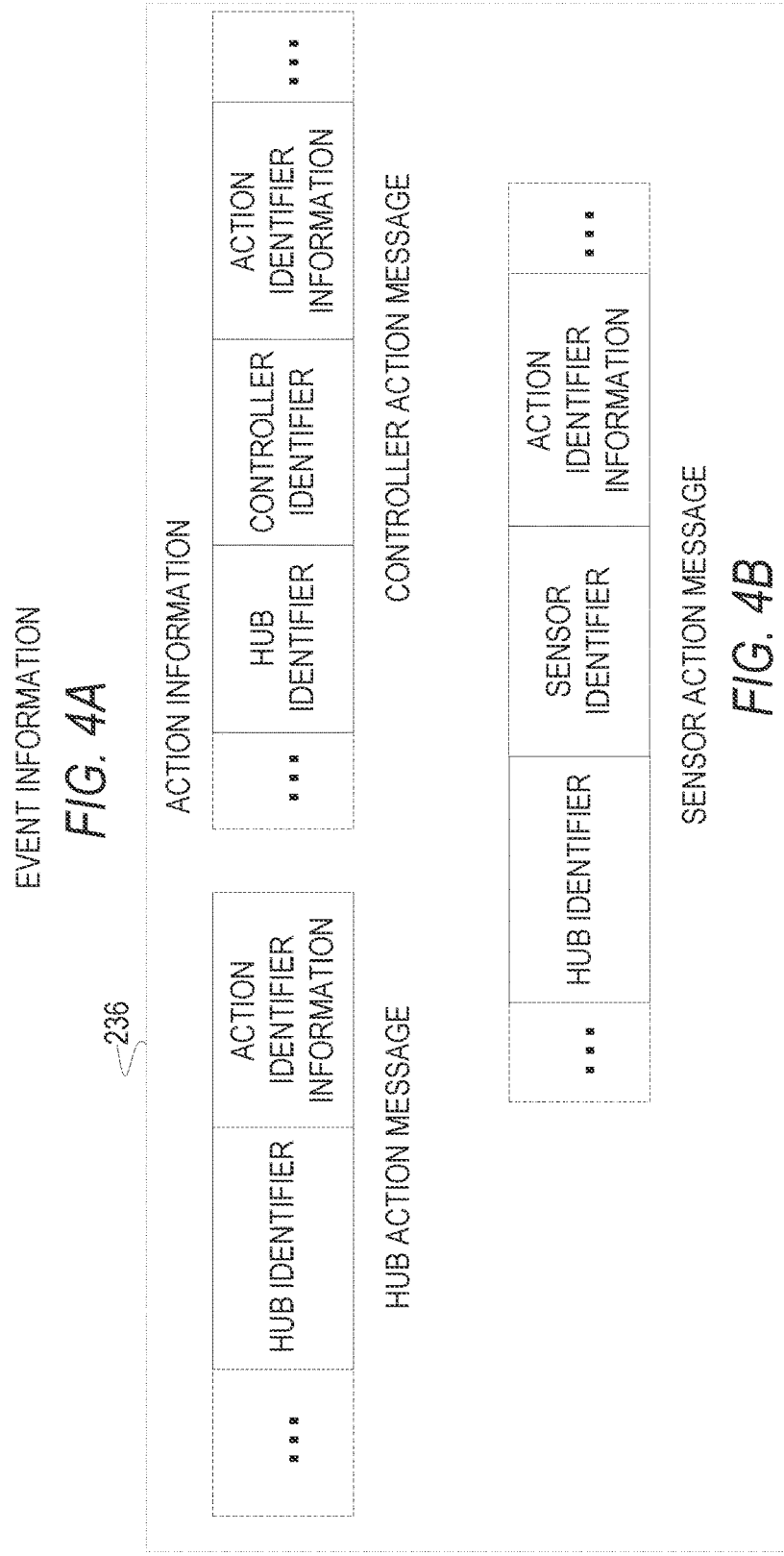
FIG. 4A is a block diagram illustrating event information, according to an embodiment, to monitor traffic information.
FIG. 4B is a block diagram illustrating action information, according to an embodiment, to monitor traffic information.

FIG. 4A is a block diagram illustrating event information 234, according to an embodiment. The event information 234 may be communicated from a hub 126 to the networked system 102. The event information 234 may include a hub identifier that identifies the hub 126 that communicated the event information 234 and hub event information. For example, the hub event information may include a status of the hub 126. The event information 234 may further include optional data fields. The optional data fields may include one or more entries of a sensor identifier and sensor event information. In addition, the optional data may include one or more entries of a controller identifier and controller event information. The sensor identifier identifies the sensor that communicated the sensor event information. The sensor event information may include a status or measurement being communicated by the sensor 128. The controller identifier identifies a controller 130 that communicated the controller event information. The controller event information may include a status or measurement being communicated by the controller 130.

FIG. 4B is a block diagram illustrating action information 236, according to an embodiment. The action information 236 may be communicated from the home fleet management application 232 to a hub 126. The action information 236 may include a hub action message, a controller action message, or a sensor action message. The hub action message is communicated to a hub 126. The controller action message is communicated to one or more controllers 130 that are paired to a hub 126. The sensor action message is communicated one or more sensors 128 that are paired to a hub 126. The hub action message may include a hub identifier and action identifier information. The hub identifier identifies the hub 126 that is the intended recipient of the action identifier information. The action identifier information includes an action to be performed by the hub 126 and parameter information. For example, the action identifier may identify a hub restart and the parameter information may include a parameter describing the type of restart.

The controller action message may include a hub identifier and one or more pairs of a controller identifier/action identifier information. The hub identifier identifies the hub 126 that is intended recipient of the controller action message and the controller identifier identifies the controller 130 that is the intended recipient of the corresponding action identifier information. The action identifier information includes an action identifier that identifies an action to be performed by the controller 130 and parameter information. For example, the action identifier may identify an action to set a thermostat that controls a home furnace/air conditioner and the parameter information may include a high temperature threshold value that is compared with the ambient temperature to turn the furnace off. For example, if the ambient temperature is equal to or below the high temperature threshold value, then the furnace is turned on; if the ambient temperature is above the high temperature threshold value, then the furnace is turned off.

The sensor action message includes a hub identifier and one or more pairs of a sensor identifier/action identifier information. The hub identifier identifies the hub 126 that is the intended recipient of the sensor action message and the sensor identifier identifies the sensor 128 that is the intended recipient of the action identifier information immediately following the sensor identifier. The action identifier information includes an action identifier that identifies an action to be performed by the sensor 128 and parameter information. For example, the action identifier may identify an action to cause the sensor 128 to communicate sensor information (e.g., measurement of ambient temperature in Fahrenheit) and the parameter information may include one or more parameters (e.g., period to communicate the event information 234 to report the ambient temperature) (e.g., 5 seconds).

Figure 5A:
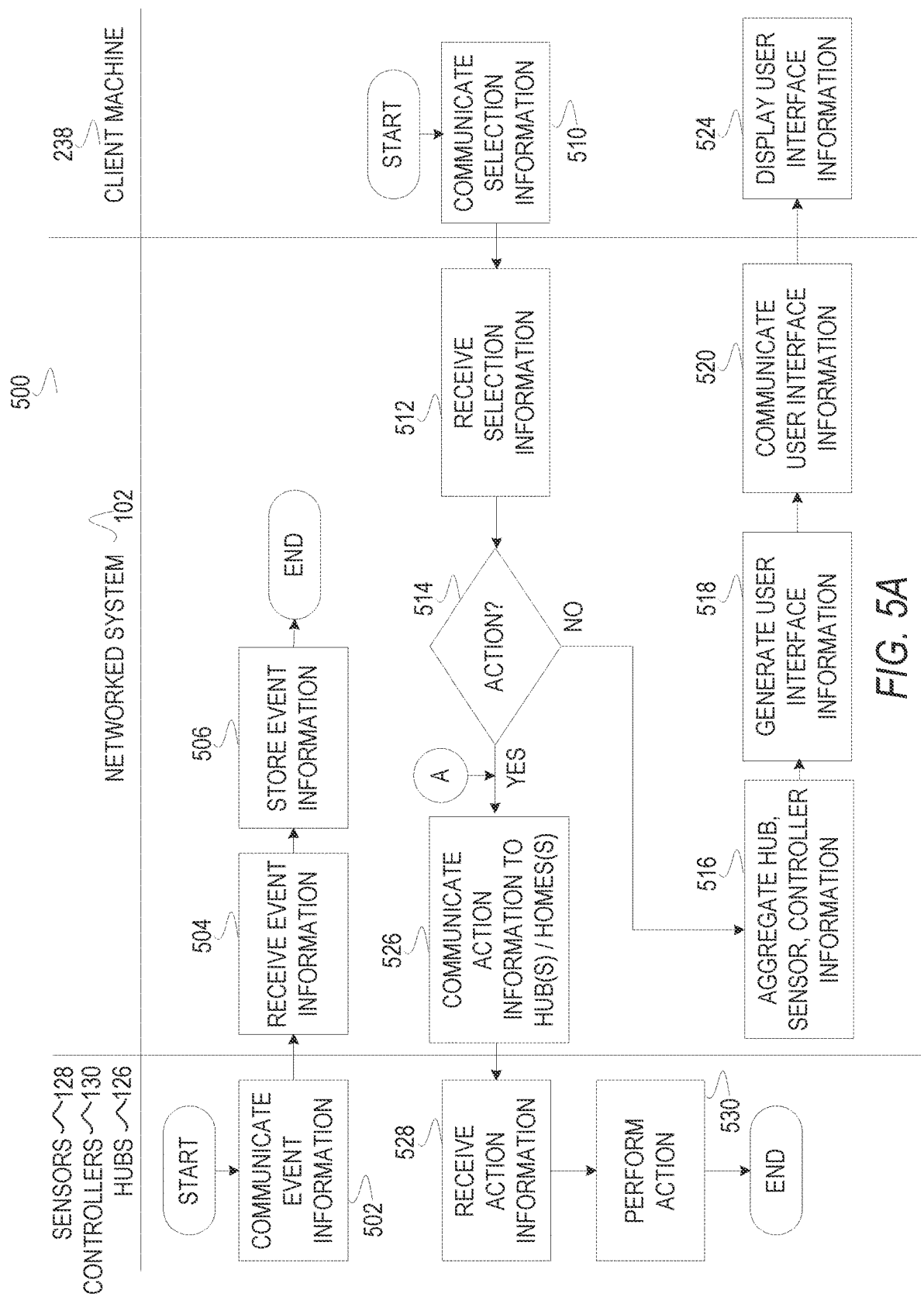
FIG. 5A is a block diagram illustrating a method, according to an embodiment, to receive and process event information.

FIG. 5A is a block diagram illustrating a method 500, according to an embodiment, to receive and process event information 234. Illustrated on the left are operations performed by sensors 128, controllers 130, and hubs 126. Illustrated in the middle are operations performed by the networked system 102. Illustrated on the right are operations performed by the client machine 238.

The method 500 commences, at operation 502, with one or more hubs 126 communicating, over the network 104, the event information 234 to the networked system 102. For example, the one or more hubs 126 may previously have received the event information 234, over the network 124 (not shown) (e.g., wireless LAN), within one or more homes 108 from sensors 128 and controllers 130 within the respective homes 108, before communicating the event information 234 to the networked system 102.

At operation 504, the networked system 102 receives the event information 234. For example, managed cloud platform 230 may receive the event information 234 and communicate the event information 234 to the receiving module 256.

At operation 506, the processing module 258 stores the event information 234 in the databases 254. For example, the processing module 258 may extract the hub identifier and hub event information from the event information 234 before storing the hub event information in the hub information 304 based on the hub identifiers. Further, the processing module 258 may update the desired state information 322 and/or current state information 320 for the hub 126 based on the hub event information. According to one embodiment, the processing module 258 may store the hub event information as current state information 320, desired state information 322, metadata information 324, or policy information 326.

Further for example, the processing module 258 may extract pairs of sensor identifier/sensor event information from the event information 234 and store the sensor event information in the sensor information 340 based on the sensor identifier. Further, the processing module 258 may update the desired state information 342 and/or current state information 341 based on the sensor event information. According to one embodiment, the processing module 258 may store the sensor event information as current state information 341, desired state information 342, metadata information 344, or policy information 346.

Further for example, the processing module 258 may extract pairs of controller identifier/controller event information from the event information 234. In addition, the processing module 258 may store the controller event information in the controller information 360 based on the controller identifier. Further, the processing module 258 may update the desired state information 364 and/or current state information 362 based on the controller event information. According to one embodiment, the processing module 258 may store the controller event information as current state information 362, desired state information 364, metadata information 366, or policy information 368.

At operation 510, the client machine 238 communicates command information 240 in the form of selection information, over a network, to the networked system 102. The selection information may be identified based on one or more selections from pull-down menus and communicated to the networked system 102. For example, the selection information may include a geographic area identifier identifying all cities or a city (e.g., Phoenix) and/or a metric identifier identifying all metrics (e.g., system issues) or a metric (e.g., system online, devices paired, device normal, device normal, temperature in range, access issue, and so forth). In addition, the selection information may include an action identifier identifying an action to be performed in one or more home electronic systems 106. The action identifier causes the action to be performed for the home electronic systems 106 presently being displayed. For example, receipt of an action identifier to reset a temperature range may be applied to all home electronic systems 106 in a city responsive to identifying all home electronic systems 106 in a city are being displayed.

At operation 512, the networked system 102 receives the selection information. For example, the managed cloud platform 230 may receive that selection information and communicate the selection information to the receiving module 256.

At decision operation 514, the processing module 258 identifies whether the selection information identifies action information 236 that is to be communicated to one or more home electronic systems 106. If the processing module 258 identifies the selection information identifies action information 236, then a branch is made to operation 526. Otherwise a branch is made to operation 516.

At operation 516, the processing module 258 aggregates home fleet information 260 (e.g., hub information 304 and/or home sensor information 306 and/or home controller information 308) to generate aggregated information. For example, the processing module 258 may aggregate current state information 341 and/or metadata information 344 to generate aggregated information for sensors (e.g., sensor information) that sense temperatures in homes 108.

At operation 518, the processing module 258 may generate user interface information based on the aggregated information. For example, the processing module 258 may generate user interface information illustrating temperature out of range for home electronic systems 106 located in a geographic area based on the above described aggregated sensor information.

At operation 520, the processing module 258 may communicate the user interface information, over the network, for display on the client machine 238. For example, the user interface information may be displayed on the client machine 238 as illustrated in FIG. 6A, FIG. 6B or FIG. 6C.

At operation 524, the user interface information is received at the client machine 238 and displayed on a monitor coupled to the client machine 238. For example, the user interfaces illustrated in FIG. 6A, FIG. 6B or FIG. 6C may be displayed on the monitor.

At operation 526, the processing module 258 may communicate action information 236, over the network, to the identified hub(s) 126 that, in turn, may communicate the action information 236 to the identified sensor(s) 128 and or/controller(s) 130. The action information 236 may include a controller action message including a hub identifier(s), controller identifier(s), an action identifier, and parameter information. For example, the action identifier may identify an action to set a thermostat that controls a home furnace/air conditioner and the parameter information may include a low temperature threshold value and/or a high temperature threshold value.

At operation 528, the action information 236 is received at the appropriate hub(s) 126 that, in turn, communicate the action information 236 to the identified sensor(s) 128 and/or controller(s) 130.

At operation 530, the action information 236 is executed at the appropriate hub(s) 126 and/or sensor(s) 128 and or/controller(s) 130. For example, a configuring a thermostat with a high temperature threshold values may cause the furnace to turn on responsive to identifying an ambient temperature as being below the high temperature threshold value and to turn off responsive to identifying an ambient temperature equal to or above the high temperature threshold value. Further for example, configuring a thermostat with a low temperature threshold values may cause an air conditioning (AC) unit to turn on responsive to identifying an ambient temperature above the low temperature threshold value and to turn off responsive to identifying an ambient temperature equal to or below the low temperature threshold value.

Figure 5B:
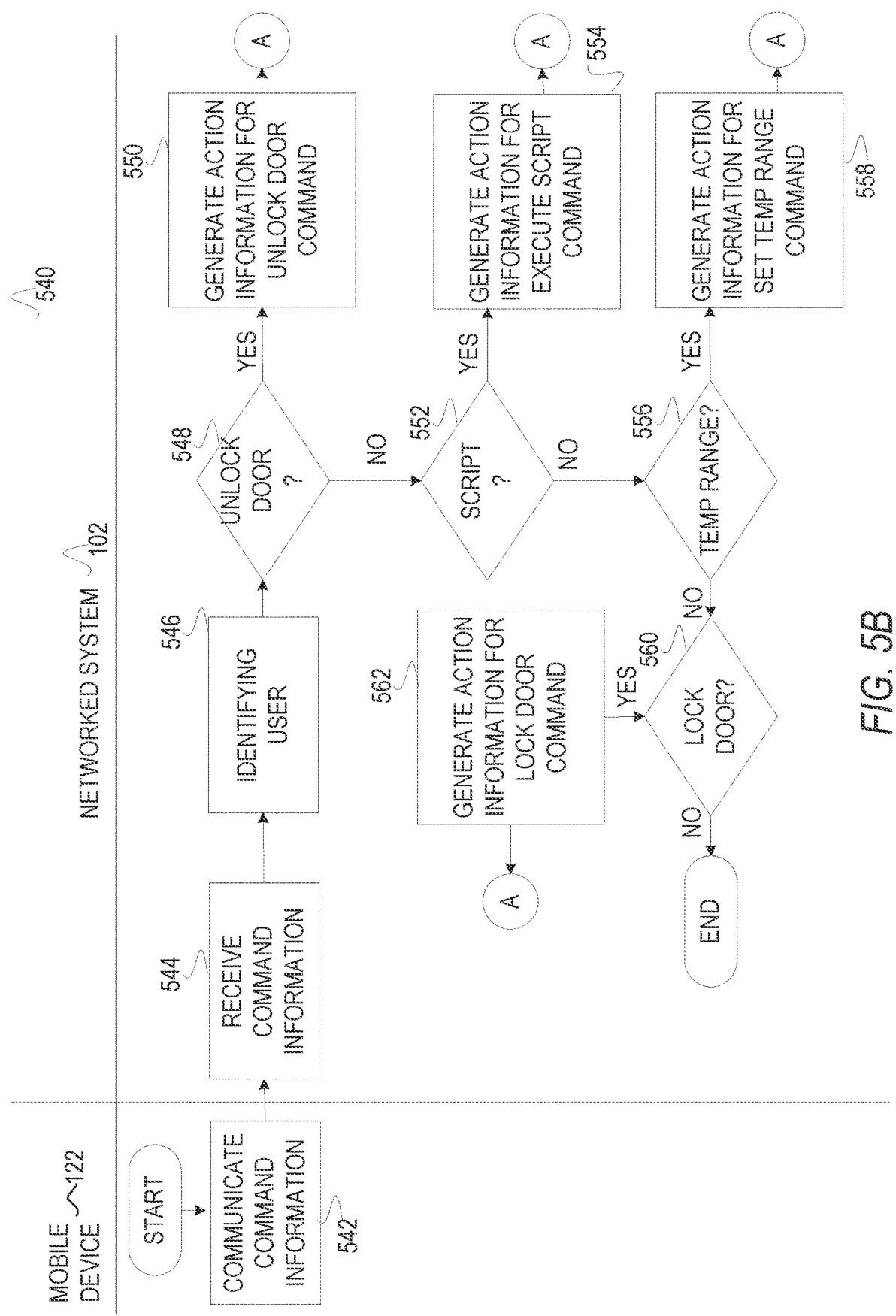
FIG. 5B is a block diagram illustrating a method, according to an embodiment, to process command information.

FIG. 5B is a block diagram illustrating a method 540, according to an embodiment, to process command information 240 being received from a mobile device 122. Illustrated on the left are operations performed by the mobile device 122 (e.g., mobile phone) and illustrated in the middle are operations performed by the networked system 102. The method 540 commences at operation 542 with a user selecting a button on a user interface being presented by the mobile device 122. For example, the user may select the button, "Unlock Door." Responsive to receiving the selection, the mobile device 122 may communicate the corresponding command information 240, over the network 104 (e.g., 4G, Internet, and so forth.), to the networked system 102.

At operation 544, the networked system 102 receives the command information 240. For example, the managed cloud platform 230, at the networked system 102, may receive the command information 240 and communicate the command information 240 to the receiving module 256 in the home fleet management application 232. The command information 240 may include a command identifier and parameters. The command identifier may be processed by the home fleet management application 232 to cause action information 236 to be communicated to a home electronic system 106 to perform one or more operations. For example, the command identifiers may identify an "Unlock Door" command, a "Lock Door" command, a "Set Temperature Range" command, an "Illuminate Light" command, an "Extinguish Light" command, an "Adjust Light" (e.g., dim or brighten) command, a "Play Music" command, a "Stop Music" command, an "Execute Script" command, and so forth. Each command may further be associated with one or more parameters. For example, a parameter may include a home identifier, a mobile device 122 identifier, a user identifier identifying the user who is operating the mobile device 122, a location identifier identifying the location of the mobile device 122. Further, a parameter may be associated with a command. For example, a script identifier may be associated with the "Execute Script" command and identify a script from a group of scripts, and so forth.

At operation 546, the processing module 258 identifies the user who is operating the mobile device 122. For example, the processing module 258 may utilize a user identifier included in the command information 240 to access the appropriate user information 380 in the user registry 262. Also, for example, the processing module 258 may utilize the device identifier to search the user registry 262 and identify the user.

Below, examples are provided for the "Unlock Door" command, the "Execute Script" command, the "Set Temperature Range" command, and the "Lock Door" command.

"Unlock Door" Command

At decision operation 548, the processing module 258 identifies whether the command information 240 includes an "Unlock Door" command. If the processing module 258 identifies the "Unlock Door" command, then a branch is made to operation 550. Otherwise, a branch is made to decision operation 552.

At operation 550, the processing module 258 generates action information 236 associated with the "Unlock Door" command and communicates the action information 236 to the appropriate hub 126, as illustrated, at operation "A," on FIG. 5A, as previously described. The processing module 258 may identify the appropriate hub 126 based on the home identifier or the location identifier identifying the location of mobile device 122 (e.g., by comparing the location identifier with location information 302).

The "Unlock Door" command may be associated with parameters including a door identifier identifying a door in the home 108 to unlock, an all-door identifier that identifies all doors in the home 108 are to be unlocked, a lock identifier identifying a lock on the identified door is to be unlocked, an all-lock identifier identifying all locks on the identified door(s) are to be unlocked, and so forth. The parameters may be received from the mobile device 122 or retrieved from user preference information 384 associated with the user who is operating the mobile device 122.

"Execute Script" Command

At decision operation 552, the processing module 258 identifies whether the command information 240 includes an "Execute Script" command. If the processing module 258 identifies the "Execute Script" command, then a branch is made to operation 554. Otherwise, processing continues at decision operation 556.

At operation 554, the processing module 258 generates action information 236 associated with the "Execute Script" command and communicates the action information 236 to the appropriate hub 126, as illustrated at operation "A" on FIG. 5A, as previously described. The processing module 258 may identify the appropriate hub 126 based on the home identifier or the location identifier identifying the location of mobile device 122 (e.g., by comparing the location identifier with location information 302).

As mentioned above, the "Execute Script" command may be associated with parameters including a script identifier that identifies the script for execution. It will be appreciated that the identified script may have been previously authored by the user who is operating the mobile device 122 and stored as user preference information 384 in the database 254. The script may be retrieved from the user preference information 384 based on the script identifier and include one or more commands. For example, the script may include an "Unlock Door" command, a "Set Temperature Range" command, a "Set Temperature Range" command, an "Illuminate Light" command, an "Adjust Light" (e.g., brighten) command, and a "Play Music" command. In addition, each command may be associated with one or more parameters to identify and control the appropriate controllers 130. For example, each command may be associated with one or more parameters to identify and control controllers associated with doors, thermostats, lights, recorders, and so forth. Further, the user may author the script according to their preference. For example, the temperature, lighting, and music may be controlled in the home according to the preference of the user as stored in the script in the user preference information 384. Accordingly, an execution of script may cause an execution of commands in a manner and sequence as determined by the preferences of the user.

"Set Temperature Range" Command

At decision operation 556, the processing module 258 identifies whether the command information 240 includes a "Set Temperature Range" command. If the processing module 258 identifies the "Set Temperature Range" command, then a branch is made to operation 558. Otherwise, processing continues at decision operation 560.

At operation 558, the processing module 258 generates action information 236 associated with the "Set Temperature Range" command and communicates the action information 236 to the appropriate hub 126, as illustrated at operation "A" on FIG. 5A, as previously described. The processing module 258 may identify the appropriate hub 126 based on the home identifier or the location identifier identifying the location of mobile device 122 (e.g., by comparing the location identifier with location information 302).

The "Set Temperature Range" command may be received as command information including an action identifier that identifies the "Set Temperature Range" action, a low temperature threshold value, and a high temperature threshold value.

"Lock Door" Command

At decision operation 560, the processing module 258 identifies whether the command information 240 includes an "Lock Door" command. If the processing module 258 identifies the "Lock Door" command, then a branch is made to operation 562. Otherwise, processing ends.

At operation 562, the processing module 258 generates action information 236 associated with the "Lock Door" command and communicates the action information 236 to the appropriate hub 126, as illustrated at operation "A" on FIG. 5A, as previously described. The processing module 258 may identify the appropriate hub 126 based on the home identifier or the location identifier identifying the location of mobile device 122 (e.g., by comparing the location identifier with location information 302).

The "Lock Door" command may be received with parameters including a door identifier identifying a door to lock, an all-door identifier identifying all doors in the home 108 are to be lock, a lock identifier identifying a lock on the identified door is to be locked, an all-lock identifier identifying all locks on the identified door(s) are to be locked, and so forth. The parameters may be received from the mobile device 122 or retrieved from user preference information 384 associated with the user who is operating the mobile device 122.

In each of the above described commands the action information 236 may include one or more hub action messages for controlling a hub 126, one or more controller action messages for controlling controllers 130, one or more sensor action messages for controlling sensors 128.

FIG. 6A illustrates a user interface 600, according to an embodiment. The user interface 600 may include visible user interface elements that are generated by the processing module 258. The user interface 600 may be generated by the processing module 258 based user interface information (e.g., first user interface information). The user interface 600 may include a header panel 602 including header information and a body panel 604 including body information. The header panel 602 may include a home identifier input mechanism 606, a selection information input mechanism 608, and a submit button 609. The home identifier input mechanism 606 may receive selection information in the form of a home identifier identifying a single home electronic system 106. For example, the home identifier may include an address (e.g., street, city, zip code), an alphanumeric expression, a numeric expression, or some other identifier that uniquely identifies a home 108 in the system 100 (not shown). Responsive to receiving the home identifier, the processing module 258 displays a user interface including user interface information associated with the home electronic system 106 that is identified with the home identifier.

The selection information input mechanism 608 may include a metric input mechanism 610, a geographic input mechanism 612, and an action input mechanism 614. The metric input mechanism 610 and the geographic input mechanism 612 may be utilized, alone or in combination, to receive command information 240. The action input mechanism 614 is utilized alone to receive command information 240. The action input mechanism 614 is utilized for performing actions (e.g., controlling the hubs 126, sensors 128, and/or controllers 130) in the home electronic systems 106 presently being displayed.

The metric input mechanism 610 may include a pull-down menu or a keyboard receiver box to facilitate the reception of typed input. The metric input mechanism 610 may be utilized to select or input a metric identifier. For example, the metric identifier may identify a paired metric including "System—healthy/issues," "System—online/offline," "Paired—all/issues," "Access—normal/issues," "Temperature—in range/out of range," "All sensor—normal/trouble," and so forth. The paired metric presentation architecture simultaneously presents the same metric on a single user interface from two points of view. The paired metric architecture facilitates an immediate viewing of both perspectives of the same information (e.g., aggregated sensor information). Accordingly, the paired metric architecture has the advantage of enabling a quick apprehension by the user in accordance with the desired perspective of the user. The paired metric architecture has the further advantage of eliminating tedious conversion of metric information from one point of view to the other.

The "System—healthy/issues" paired metric quantifies home electronic systems 106 according to an equipment malfunction (e.g., sensor inoperative, door open, and so forth.). For example, responsive to the processing module 258 identifying any one of a hub 126, sensor 128, or controller 130 as malfunctioning, then the processing module 258 identifies the home electronic system 106 as having a system issue.

The "System—online/offline" paired metric quantifies home electronic systems 106 according to network connectivity. For example, responsive to the processing module 258 identifying any hub 126 in a home electronic system 106 as not responding to a network communication that requires a response, the processing module 258 identifies the home electronic system 106 as offline.

The "Paired—all/issues" paired metric quantifies home electronic systems 106 according to pairing. For example, responsive to the processing module 258 identifying any one of a sensor 128 or controller 130 in a home electronic system 106 as failing a pairing to the hub 126 (e.g., via the mobile device 122), the processing module 258 identifies the home electronic system 106 as having a pairing issue.

The "Access—normal/issues" paired metric quantifies home electronic systems 106 according to access. For example, responsive to the processing module 258 identifying a sensor 128 identifying a door as not opening/closing as expected or not locking/unlocking as expected, the processing module 258 identifies the home electronic system 106 as having an access issue.

The "Temperature—in range/out of range" paired metric (e.g., temperature out of range metric) quantifies home electronic systems 106 according to ambient temperature. For example, responsive to the processing module 258 identifying a sensor 128 sensing an ambient temperature in the home electronic system 106 as being outside of a predetermined temperature range (e.g., high temperature threshold value, low temperature threshold value), the processing module 258 identifies the home electronic system 106 as having a temperature that is out of range.

The "All sensor—normal/trouble" paired metric quantifies home electronic systems 106 according to sensor(s) 128 identified as having trouble. For example, responsive to the processing module 258 identifying a sensor 128 in a home electronic system 106 as reporting a problem in a first category (e.g., category "sensor trouble"), the processing module 258 identifies the home electronic system 106 as including sensor(s) 128 not normal (e.g., sensor trouble).

The geographic input mechanism 612 may include a pull-down menu or a keyboard receiver box to facilitate the reception of typed input. The geographic input mechanism 612 may be utilized to identify (e.g., select) selection information in the form of a geographic identifier that identifies a geographic area. For example, the geographic area may include a city, a county, a state, a country, a district, or any area defined by one or more boundaries. Further for example, the geographic area may be a customized geographic area. For example, the customized geographic area may be defined by the processing module 258 receiving (e.g., client machine 238) a perimeter of the customized geographic area.

The action input mechanism 614 may include a pull-down menu or a keyboard receiver box to facilitate the reception of typed input. The action input mechanism 614 may be utilized to identify (e.g., select) selection information in the form of an action identifier. For example, the action identifier may identify an action to "Set Temperature Range," "Restart Hub," "Unlock Home," "Change Code," "Change Battery," and so forth. The "Restart Hub" action may cause one or more hubs 126 to restart. The "Unlock Home" action may cause the lock(s) in one or more homes 108 to unlock. The "Change Code" may be used to update a code that is required as input (e.g., via mobile device 122) to enter one or more homes 108. The "Change Battery" may cause one or more hubs 126 to switch from an active to a backup battery, and so forth. The action identifier corresponds to action information 236 that is communicated to the one or more hubs 126 that, in turn, may communicate the action information 236 to one or more sensor(s) 128, and/or one or more controllers 130.

The body panel 604 may include paired metric detail in the form of complimentary positive information 618 and complimentary negative information 620. For example, the user interface 600 illustrates complimentary positive information 618 in the form of aggregated sensor information indicating healthy systems (e.g., home electronic systems 106) and complimentary negative information 620 in the form aggregated sensor information indicating system issues (e.g., home electronic systems 106).

FIG. 6B illustrates a user interface 630, according to an embodiment. The user interface 630 corresponds to the user interface 600 in FIG. 6A; accordingly, the same or similar references have been used to indicate the same or similar features unless otherwise indicated. The user interface 630 may include visible user interface elements that are generated by the processing module 258 based on user interface information. The user interface 630 displays "Temperature—in range/out of range" information as complimentary positive information 618 and complimentary negative information 620. The user interface 630 may be displayed from the user interface 600 by selecting the metric identifier corresponding to the metric for "Temperature—in range/out of range" from metric input mechanism 610 (e.g., pull down menu) and by selecting the submit button 609. Accordingly, the geographic areas being displayed in the user interface 600 remain unchanged (e.g., ALL and cities) and are redisplayed on the user interface 630.

FIG. 6C illustrates a user interface 640, according to an embodiment. The user interface 640 corresponds to the user interface 600 in FIG. 6A and the user interface 630 in FIG. 6B; accordingly, the same or similar references have been used to indicate the same or similar features unless otherwise indicated. The user interface 640 may include visible user interface elements that are generated by the processing module 258 based on user interface information (e.g., second user interface information). The user interface 630 displays "Temperature—in range/out of range" information as complimentary positive information 618 and complimentary negative information 620. The user interface 640 displays metric for "Temperature—in range/out of range" for home electronic systems 106 located in a geographic area (e.g., first geographic area) corresponding to a city (e.g., Phoenix). The body panel 604 displays rows 642 of home electronic systems 106 (e.g., second plurality of home electronic systems) located in the city of Phoenix. Each row 642 includes columns of information including address information 644, zip code information 646, and a status 648. The address information 644 may include the mailing address of the home 108. The zip code information 646 may include the zip code of the home 108. The status 648 indicates whether the status of the ambient temperature of the home 108 is included in a predetermined temperature range (e.g., high temperature threshold value, low temperature threshold value).

The user interface 640 may be displayed from the user interface 600 by selecting the metric identifier corresponding to the metric for "Temperature—in range/out of range" from metric input mechanism 610 (e.g., pull down menu) and by selecting the geographic identifier corresponding to the metric for "Arizona" from geographic input mechanism 612 (e.g., pull down menu) and, finally, by selecting the submit button 609.

The action input mechanism 614 may be utilized to identify (e.g., select) selection information, as previously described. For example, via the user interface 640, the action input mechanism 614 may be utilized to establish or reestablish a temperature range for the homes being displayed. The action input mechanism 614 may be utilized to receive selection information in the form of an action identifier that identifies the "Set Temperature Range" action, a low temperature threshold value, and a high temperature threshold value. Responsive to receiving the selection information, the processing module 258 may communicate the selection information in controller action messages to the home electronic systems 106 corresponding to the homes 108 displayed on the user interface 640.

Machine And Software Architecture

The modules, methods, engines, applications, and so forth, described in conjunction with FIGS. 1A-6C are implemented in some embodiments in the context of multiple machines and associated software architectures. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the disclosure in different contexts from the disclosure contained herein.

Software Architecture

Figure 7:
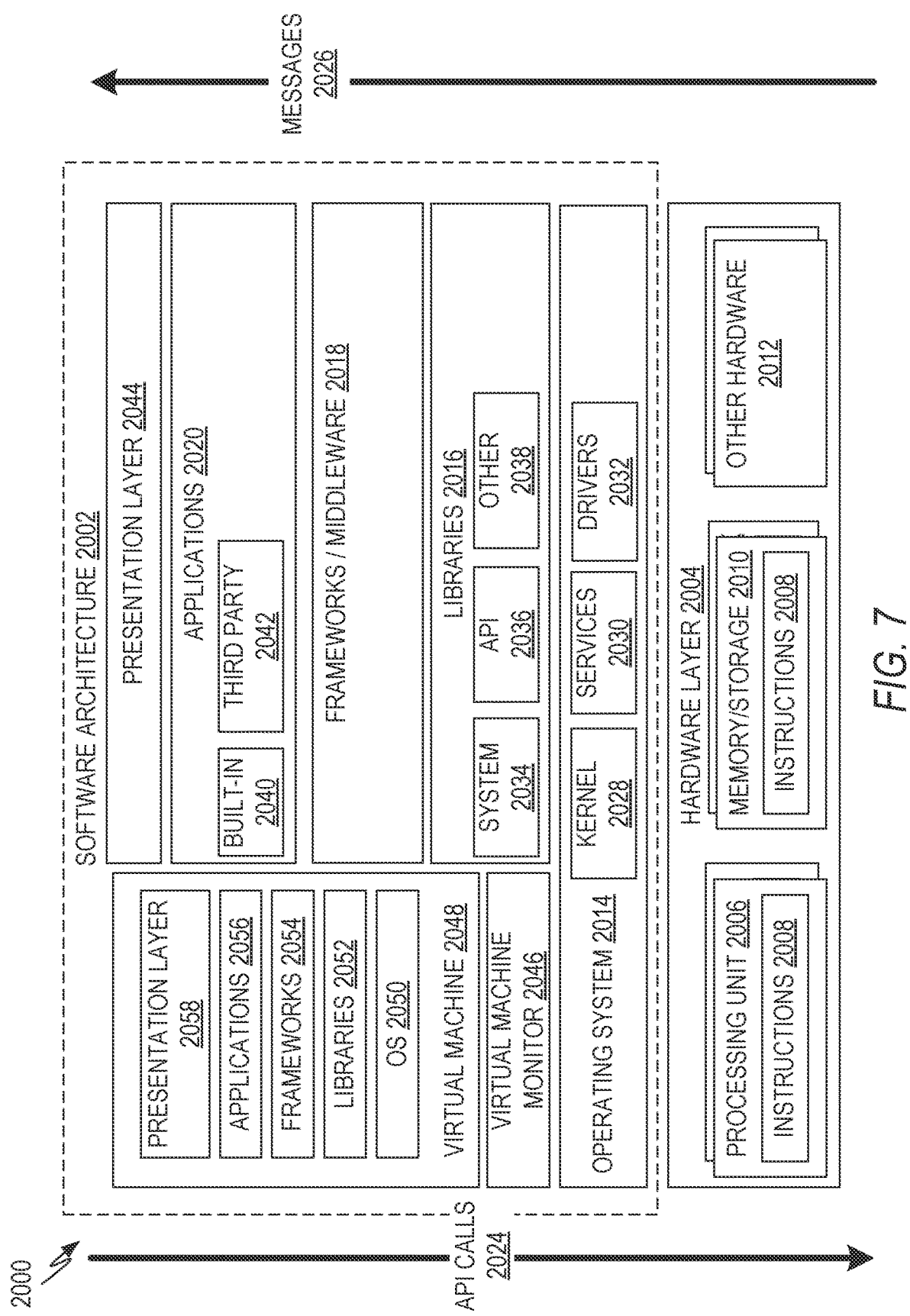
FIG. 7 is a block diagram illustrating a representative software architecture.

FIG. 7 is a block diagram 2000 illustrating a representative software architecture 2002, which may be used in conjunction with various hardware architectures herein described. FIG. 7 is merely a non-limiting example of a software architecture 2002, and it will be appreciated that many other architectures may be implemented to facilitate the functionality described herein. The software architecture 2002 may be executing on hardware such as a machine 2100 of FIG. 8 that includes, among other things, processors 2110, memory/storage 2130, and I/O components 2150. Returning to FIG. 7, a representative hardware layer 2004 is illustrated and can represent, for example, the machine 2100 of FIG. 8. The representative hardware layer 2004 comprises one or more processing units 2006 having associated executable instructions 2008. The executable instructions 2008 represent the executable instructions of the software architecture 2002, including implementation of the methods, engines, modules, and so forth of FIGS. 1A-6C. The hardware layer 2004 also includes memory and/or storage modules 2010, which also have the executable instructions 2008. The hardware layer 2004 may also comprise other hardware 2012, which represents any other hardware of the hardware layer 2004, such as the other hardware 2012 illustrated as part of the machine 2100.

In the example architecture of FIG. 7, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke application programming interface (API) calls 2024 through the software stack and receive a response, returned values, and so forth, illustrated as messages 2026, in response to the API calls 2024. The layers illustrated are representative in nature, and not all software architectures have all layers. For example, some mobile or special purpose operating systems 2014 may not provide a frameworks/middleware 2018 layer, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system libraries 2034 (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as moving picture experts group (MPEG) 4, H.264, MPEG-1 or MPEG-2 Audio Layer (MP3), AAC, AMR, joint photography experts group (JPG), or portable network graphics (PNG)), graphics libraries (e.g., an Open Graphics Library (OpenGL) framework that may be used to render 2D and 3D graphic content on a display), database libraries (e.g., Structured Query Language (SQL), SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be utilized by the applications 2020 and/or other software components/modules, some of which may be specific to a particular operating system 2014 or platform.

The applications 2020 include built-in applications 2040 and/or third party applications 2042. Examples of representative built-in applications 2040 may include, but are not limited to, a contacts application, a browser application, a book reader application, a location application, a media application, a messaging application, and/or a game application. Third-party applications 2042 may include any of the built-in applications as well as a broad assortment of other applications 2020. In a specific example, the third-party application 2042 (e.g., an application developed using the Android™ or iOS™ software development kit (SDK) by an entity other than the vendor of the particular platform) may be mobile software running on a mobile operating system 2014 such as iOS™, Android™, Windows® Phone, or other mobile operating systems 2014. In this example, the third-party application 2042 may invoke the API calls 2024 provided by the mobile operating system such as the operating system 2014 to facilitate functionality described herein.

The applications 2020 may utilize built-in operating system functions (e.g., kernel 2028, services 2030, and/or drivers 2032), libraries (e.g., system libraries 2034, API libraries 2036, and other libraries 2038), and frameworks/middleware 2018 to create user interfaces to interact with users of the system. Alternatively, or additionally, in some systems, interactions with a user may occur through a presentation layer, such as the presentation layer 2044. In these systems, the application/module "logic" can be separated from the aspects of the application/module that interact with a user.

Some software architectures 2002 utilize virtual machines. In the example of FIG. 7, this is illustrated by a virtual machine 2048. The virtual machine 2048 creates a software environment where applications/modules can execute as if they were executing on a hardware machine (such as the machine 2100 of FIG. 8, for example). The virtual machine 2048 is hosted by a host operating system (e.g., operating system 2014 in FIG. 7) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Example Machine Architecture and Machine-readable Medium

Figure 8:
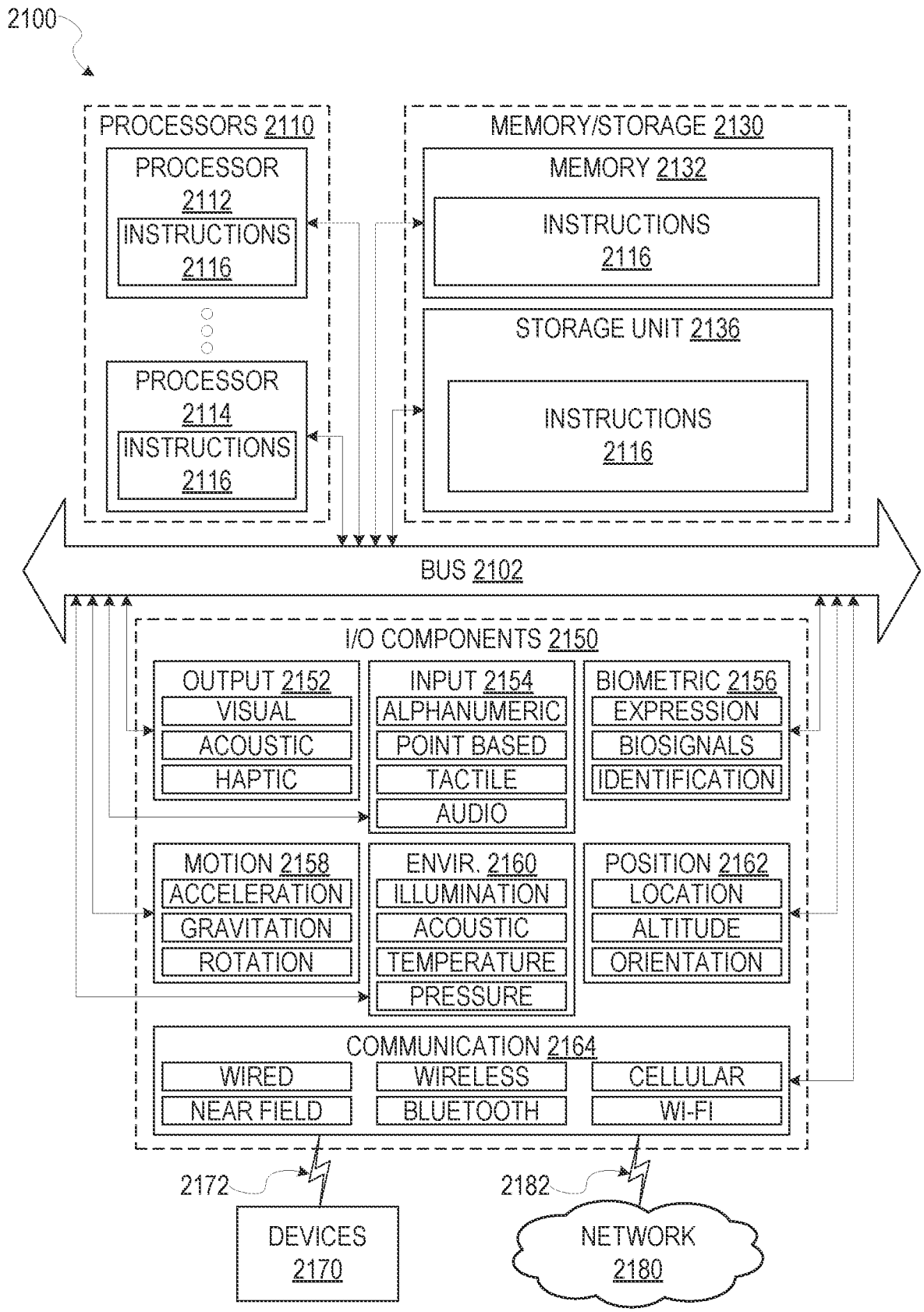
FIG. 8 is a block diagram illustrating components of a machine, according to some example embodiments.

FIG. 8 is a block diagram illustrating components of a machine 2100, according to some example embodiments, able to read instructions from a machine-readable medium (e.g., a machine-readable storage medium) and perform any one or more of the methodologies discussed herein. Specifically, FIG. 8 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example, the instructions 2116 may cause the machine 2100 to execute the flow diagrams of FIGS. 1A-6C. Additionally, or alternatively, the instructions 2116 may implement the installation application 200 of FIG. 2A, the operation application 202 of FIG. 2A, the managed cloud platform 230 of FIG. 2B, the home fleet management application 232 of FIG. 2B, and so forth, including the modules, engines, and applications necessary to implement the system 100 in FIG. 1A and the home electronic system 106 in FIG. 1B. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 2112 and a processor 2114 that may execute the instructions 2116. The term "processor" is intended to include multi-core processors 2110 that may comprise two or more independent processors 2110 (sometimes referred to as "cores") that may execute the instructions 2116 contemporaneously. Although FIG. 8 shows multiple processors 2110, the machine 2100 may include a single processor 2110 with a single core, a single processor 2110 with multiple cores (e.g., a multi-core processor), multiple processors 2110 with a single core, multiple processors 2110 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-readable media.

As used herein, "machine-readable medium" means a device able to store the instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine (e.g., processors 2110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 8. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172 respectively. For example, the communication components 2164 may include a network interface component or other suitable device to interface with the network 2180. In further examples, the communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
   at least one processor and memory having instructions that, when executed, cause the at least one processor to perform operations comprising:
   receiving, over a network, event information at a home fleet management application, the home fleet management application for managing a first plurality of home electronic systems, the event information being received from a first plurality of sensors included in the first plurality of home electronic systems, the event information including sensor information being communicated by the first plurality of sensors;
   aggregating the sensor information according to a plurality of geographic areas to generate first aggregated sensor information, the aggregating the sensor information including summarizing the sensor information, the aggregating the sensor information includes aggregating a status associated with each home electronic system of the first plurality of home electronic systems and the summarizing the sensor information includes generating a summary for the first plurality of home electronic systems based on the aggregating the status associated with each home electronic system and the status for each home electronic system is based on a physical phenomena that was sensed and compared with a predetermined range;
   generating first user interface information based on the first aggregated sensor information, the first user interface information including a first set of visible user interface elements signifying the plurality of geographic areas associated with the first aggregated sensor information, the plurality of geographic areas including a first geographic area being associated with a first portion of the first aggregated sensor information, the first user interface information enabling selection of first selection information;
   receiving, over the network, the first selection information including a metric identifier identifying a first metric from a plurality of metrics and a geographic identifier identifying the first geographic area from the plurality of geographic areas, the first plurality of home electronic systems including a second plurality of home electronic systems, the first geographic area including the second plurality of home electronic systems;
   generating second user interface information based on the first selection information, the second user interface information including a second set of visible user interface elements signifying the first metric and the second plurality of home electronic systems, the second user interface information enabling selection of second selection information;
   receiving, over the network, second selection information, the second selection information being selected based on the second user interface information, the second selection information identifying the second plurality of home electronic systems and including a first action identifier identifying a first action from a plurality of actions; and
   communicating, over the network, first action information to each home electronic system of the second plurality of home electronic systems, the first action information including an action identifier identifying the first action, the first action information being based on the second selection information, the action identifier identifying the first action to cause the first action to be performed in the second plurality of home electronic systems.

2. The system of claim 1, further comprising storing the event information in a database as home information.

3. The system of claim 2, wherein the first plurality of home electronic systems further includes a first plurality of controllers and a first plurality of hubs.

4. The system of claim 3, wherein the first plurality of hubs includes a second plurality of hubs, wherein the first plurality of sensors includes a second plurality of sensors, wherein the first plurality of controllers includes a second plurality of controllers, and wherein a city is associated with the second plurality of hubs, the second plurality of sensors, and the second plurality of controllers.

5. The system of claim 4, wherein the second plurality of hubs includes a first hub, wherein the second plurality of sensors includes a third plurality of sensors, wherein the second plurality of controllers includes a third plurality of controllers, and wherein a first home electronic system is associated with the first hub and wherein the first hub is paired with the third plurality of sensors and the third plurality of controllers.

6. The system of claim 5, wherein the home information includes first home information, wherein the first home information is associated with the first home electronic system and wherein the third plurality of controllers includes a fourth plurality of controllers, and further comprising:
   receiving, over the network, command information, the command information being received from a mobile device;
   identifying a first user and a first script based on the command information; generating second action information based on the first script; and
   communicating the second action information, over the network, to the first home electronic system, the second action information including a plurality of controller action messages causing the fourth plurality of controllers to operate according to user preference information associated with the first user.

7. The system of claim 2, wherein the plurality of geographic areas includes a plurality of cities and the first geographic area includes a first city.

8. The system of claim 2, further comprising communicating, over the network, first user interface information, the first user interface information enabling display of the first set of visible user interface elements signifying the plurality of geographic areas in association with the first aggregated sensor information.

9. The system of claim 2, wherein the status for each home electronic system is based on a temperature that was sensed and compared with a predetermined temperature range, wherein the first metric includes a temperature metric and further comprising:
communicating the second user interface information the second user interface information enabling display of a second set of visible user interface elements to indicate each home of the second plurality of home electronic systems as being associated with a temperature outside of a predetermined temperature range, the second user interface information enabling selection of the second selection information.

10. A method comprising:
receiving, over a network, event information at a home fleet management application, the home fleet management application for managing a first plurality of home electronic systems, the event information being received from a first plurality of sensors included in the first plurality of home electronic systems, the event information including sensor information being communicated by the first plurality of sensors;
aggregating the sensor information according to a plurality of geographic areas to generate first aggregated sensor information, the aggregating the sensor information including summarizing the sensor information, the aggregating being performed by at least one processor, the aggregating the sensor information includes aggregating a status associated with each home electronic system of the first plurality of home electronic systems and the summarizing the sensor information includes generating a summary for the first plurality of home electronic systems based on the aggregating the status associated with each home electronic system and the status for each home electronic system is based on a physical phenomena that was sensed and compared with a predetermined range;
generating first user interface information based on the first aggregated sensor information, the first user interface information including a first set of visible user interface elements signifying the plurality of geographic areas associated with the first aggregated sensor information, the plurality of geographic areas including a first geographic area being associated with a first portion of the first aggregated sensor information, the first user interface information enabling selection of first selection information;
receiving, over the network, the first selection information including a metric identifier identifying a first metric from a plurality of metrics and a geographic identifier identifying the first geographic area from the plurality of geographic areas, the first plurality of home electronic systems including a second plurality of home electronic systems, the first geographic area including the second plurality of home electronic systems;
generating second user interface information based on the first selection information, the second user interface information including a second set of visible user interface elements signifying the first metric and the second plurality of home electronic systems, the second user interface information enabling selection of second selection information;
receiving, over the network, second selection information, the second selection information being selected based on the second user interface information, the second selection information identifying the second plurality of home electronic systems and including a first action identifier identifying a first action from a plurality of actions; and
communicating, over the network, first action information to each home of the second plurality of home electronic systems, the first action information including an action identifier identifying the first action, the first action information being based on the second selection information, the action identifier identifying the first action to cause the first action to be performed in the second plurality of home electronic systems.

11. The method of claim 10, further comprising storing the event information in a database as home information.

12. The method of claim 11, wherein the first plurality of home electronic systems further includes a first plurality of controllers and a first plurality of hubs.

13. The method of claim 12, wherein the first plurality of hubs includes a second plurality of hubs, wherein the first plurality of sensors includes a second plurality of sensors, wherein the first plurality of controllers includes a second plurality of controllers, and wherein a city is associated with the second plurality of hubs, the second plurality of sensors, and the second plurality of controllers.

14. The method of claim 13, wherein the communicating the first action information to the second plurality of home electronic systems includes communicating a controller action message including action identifier information via the second plurality of hubs to the second plurality of controllers.

15. The method of claim 14, wherein the action identifier information includes thermostat controller information to cause a thermostat to establish a temperature range.

16. The method of claim 11, wherein the second selection information includes hub information, and wherein the communicating the first action information to the second plurality of home electronic systems includes communicating a hub action message including the hub information to the second plurality of hubs.

17. The method of claim 16, wherein the hub information includes hub controller information to cause a hub to restart.

18. The method of claim 11, wherein the plurality of geographic areas includes a plurality of cities and the first geographic area includes a first city.

19. A non-transitory machine-readable medium and storing a set of instructions that, when executed by a processor, causes a machine to perform operations comprising:
receiving, over a network, event information at a home fleet management application, the home fleet management application for managing a first plurality of home electronic systems, the event information being received from a first plurality of sensors included in the first plurality of home electronic systems, the event information including sensor information being communicated by the first plurality of sensors;
aggregating the sensor information according to a plurality of geographic areas to generate first aggregated sensor information, the aggregating the sensor information including summarizing the sensor information, the aggregating the sensor information includes aggregating a status associated with each home electronic system of the first plurality of home electronic systems and the summarizing the sensor information includes generating a summary for the first plurality of home electronic systems based on the aggregating the status associated with each home electronic system and the status for each home electronic system is based on a physical phenomena that was sensed and compared with a predetermined range;

generating first user interface information based on the first aggregated sensor information, the first user interface information including a first set of visible user interface elements signifying the plurality of geographic areas associated with the first aggregated sensor information, the plurality of geographic areas including a first geographic area being associated with a first portion of the first aggregated sensor information, the first user interface information enabling selection of first selection information;

receiving, over the network, the first selection information including a metric identifier identifying a first metric from a plurality of metrics and a geographic identifier identifying the first geographic area from the plurality of geographic areas, the first plurality of home electronic systems including a second plurality of home electronic systems, the first geographic area including the second plurality of home electronic systems;

generating second user interface information based on the first selection information, the second user interface information including a second set of visible user interface elements signifying the first metric and the second plurality of home electronic systems, the second user interface information enabling selection of second selection information;

receiving, over the network, second selection information, the second selection information being selected based on the second user interface information, the second selection information identifying the second plurality of home electronic systems and including a first action identifier identifying a first action from a plurality of actions; and communicating, over the network, first action information to each home of the second plurality of home electronic systems, the first action information including an action identifier identifying the first action, the first action information being based on the second selection information, the action identifier identifying the first action to cause the first action to be performed in the second plurality of home electronic systems.

20. The non-transitory machine-readable medium of claim 19, further comprising storing the event information in a database as home information.

* * * * *